(12) United States Patent
Frisbee et al.

(10) Patent No.: US 12,493,888 B2
(45) Date of Patent: Dec. 9, 2025

(54) IDENTIFYING AND GRADING SYSTEM AND RELATED METHODS FOR COLLECTIBLE ITEMS

(71) Applicant: COLLECTORS UNIVERSE, INC., Santa Ana, CA (US)

(72) Inventors: Mark Frisbee, Ladera Ranch, CA (US); John Nelson, Trabuco Canyon, CA (US); Imir Kalkanci, Anaheim, CA (US)

(73) Assignee: COLLECTORS UNIVERSE, INC., Santa Ana, CA (US)

( * ) Notice: Subject to any disclaimer, the term of this patent is extended or adjusted under 35 U.S.C. 154(b) by 0 days.

(21) Appl. No.: 18/941,586

(22) Filed: Nov. 8, 2024

(65) Prior Publication Data

US 2025/0069091 A1 Feb. 27, 2025

Related U.S. Application Data

(63) Continuation of application No. 17/390,751, filed on Jul. 30, 2021, now Pat. No. 12,141,817.
(Continued)

(51) Int. Cl.
*G06Q 30/018* (2023.01)
*G06F 18/21* (2023.01)
(Continued)

(52) U.S. Cl.
CPC ....... *G06Q 30/018* (2013.01); *G06F 18/2178* (2023.01); *G06N 3/082* (2013.01); *G06Q 30/0278* (2013.01); *G06V 10/82* (2022.01)

(58) Field of Classification Search
CPC .............. G06Q 30/018; G06Q 30/0278; G06F 18/2178; G06N 3/082; G06N 3/045; G06N 5/02; G06N 20/00; G06V 10/82
See application file for complete search history.

(56) References Cited

U.S. PATENT DOCUMENTS

| 4,899,392 A | 2/1990 | Merton |
|---|---|---|
| 5,133,019 A | 7/1992 | Merton et al. |

(Continued)

FOREIGN PATENT DOCUMENTS

| KR | 20130061567 A | 6/2013 |
|---|---|---|
| WO | 2015080669 A1 | 6/2015 |
| WO | 2022178270 A1 | 8/2022 |

OTHER PUBLICATIONS

[Author Unknown] Imagenet Overview, 2016, Stanford Vision Lab, Stanford University, Princeton University, https://web.archive.org/web/20210125211537/http://image-net.org/about-overview, 1 page.
(Continued)

*Primary Examiner* — Alexandru Cirnu
(74) *Attorney, Agent, or Firm* — Alumen IP Law PC

(57) ABSTRACT

An automated evaluation system for obtaining images for collectible items and using artificial intelligence (AI) to analyze different parameters of the images, such as an edge parameter, a corner parameter, and a centering parameter. The system can move the collectible items, which can be collectible cards, using a robotic arm or through manual manipulation to a working area to then obtain images of the collectible items using a camera or a scanner. The images can be saved to a database and accessible by a control computer to analyze the images with the AI model. The system can provide a first-pass grade as to the authenticity and condition of the card. The grade can be manually verified by a human grader.

23 Claims, 11 Drawing Sheets

Related U.S. Application Data

(60) Provisional application No. 63/059,835, filed on Jul. 31, 2020.

(51) Int. Cl.
    *G06N 3/082*     (2023.01)
    *G06Q 30/02*     (2023.01)
    *G06V 10/82*     (2022.01)

(56) References Cited

U.S. PATENT DOCUMENTS

| | | |
|---|---|---|
| 5,220,614 A | 6/1993 | Crain |
| 5,224,176 A | 6/1993 | Crain |
| 6,239,867 B1 | 5/2001 | Aggarwal |
| 6,295,750 B1 | 10/2001 | Harwell et al. |
| 6,726,205 B1 | 4/2004 | Purton |
| 7,119,689 B2 | 10/2006 | Mallett |
| 7,660,468 B2 | 2/2010 | Goturk et al. |
| 8,234,185 B2 | 7/2012 | Davis |
| 8,626,600 B2 | 1/2014 | Yankovich et al. |
| 8,977,603 B2 | 3/2015 | Pate et al. |
| 9,050,719 B2 | 6/2015 | Valpola |
| 9,443,298 B2 | 9/2016 | Ross et al. |
| 9,538,149 B2 | 1/2017 | Williams et al. |
| 9,672,551 B2 | 6/2017 | Pate et al. |
| 9,679,319 B2 | 6/2017 | Yankovich et al. |
| 9,767,163 B2 | 9/2017 | Kass et al. |
| 10,104,197 B2 | 10/2018 | Williams et al. |
| 10,146,841 B2 | 12/2018 | Kaas et al. |
| 10,229,445 B2 | 3/2019 | Pate et al. |
| 10,360,531 B1 | 7/2019 | Stallman et al. |
| 10,445,330 B2 | 10/2019 | Kass et al. |
| 10,459,931 B2 | 10/2019 | Kass et al. |
| 10,470,740 B2 | 11/2019 | Freudenberger et al. |
| 10,500,735 B1 | 12/2019 | Menon et al. |
| 10,525,599 B1 | 1/2020 | Zutshi |
| 10,561,469 B2 | 2/2020 | Kasai et al. |
| 10,630,805 B2 | 4/2020 | Williams et al. |
| 10,753,882 B1 | 8/2020 | Mahahan et al. |
| 10,942,933 B2 | 3/2021 | Kass et al. |
| 2005/0197853 A1 | 9/2005 | Ueno |
| 2007/0187266 A1 | 8/2007 | Porter et al. |
| 2007/0279494 A1 | 12/2007 | Aman |
| 2008/0023343 A1 | 1/2008 | Macor |
| 2008/0023351 A1 | 1/2008 | Macor |
| 2010/0088168 A1 | 4/2010 | Sullivan |
| 2014/0083243 A1 | 3/2014 | Morrow |
| 2014/0279527 A1 | 9/2014 | Duke et al. |
| 2016/0210734 A1 | 7/2016 | Kass et al. |
| 2017/0343481 A1 | 11/2017 | Jahanshahi et al. |
| 2018/0246894 A1 | 8/2018 | Kass et al. |
| 2018/0246895 A1 | 8/2018 | Kass et al. |
| 2018/0268378 A1 | 9/2018 | Liu |
| 2019/0130560 A1 | 5/2019 | Horowitz et al. |
| 2019/0205959 A1 | 7/2019 | Pate et al. |
| 2019/0392457 A1 | 12/2019 | Kuntagod |
| 2020/0193666 A1 | 6/2020 | Cinnamon et al. |
| 2020/0193866 A1 | 6/2020 | Kubota |
| 2021/0042797 A1* | 2/2021 | Shamiss ............. G06Q 30/0278 |
| 2021/0065353 A1 | 3/2021 | Potter |
| 2021/0158274 A1* | 5/2021 | Patchen ................. G06F 18/24 |
| 2021/0201039 A1 | 7/2021 | Frei |
| 2021/0304559 A1 | 9/2021 | Cupersmith |
| 2022/0036371 A1 | 2/2022 | Frisbee et al. |
| 2022/0261984 A1 | 8/2022 | Shalamberidze et al. |
| 2022/0374946 A1 | 11/2022 | Kass |
| 2024/0066910 A1 | 2/2024 | Kass et al. |

OTHER PUBLICATIONS

[Author Unknown] "The World's First Online Grading Service", Online Grading Services, LLC, Dec. 1, 2002, Retrieved online https://web.archive.org/web/20021201042357/http://www.ogscard.com:80/ on Sep. 14, 2023, 1 page.

[Author Unknown] "Welcome to the CTA Grading Experts Website", CTA Grading Experts, Feb. 3, 2006, Retrieved online https://web.archive.org/web/20060203013241/http:/ctagradingexperts.com/ on Sep. 25, 2023, 1 page.

[Author Unknown] "Your Grading Company for the new Millennium", CTA Grading Experts, Feb. 13, 2006, Retrieved online https://web.archive.org/web/20060213014751/http:/www.ctagradingexperts.com/ctaflash.html on Sep. 25, 2023, 3 pages.

[Author Unknown] "Computerized Grading?", Collectors Universe, Aug. 22, 2004, Retrieved online https://forums.collectors.com/discussion/comment/2670306/#Comment_2670306 on Sep. 7, 2023, 7 pages.

Alake, Richmond. "Deep Learning: Understanding The Inception Module". Towards Data Science, Dec. 22, 2020, https://towardsdatascience.com/deep-learning-understand-the-inception-module-56146866e652, 13 pages.

"Basset, R.A., "Machine assisted visual grading of rare collectibles over the Internet"", Western Connecticut State University, 2003, 12 pages.

Crisp, S., "How to Grade a Baseball Card: Everything You Ever Wanted to Know", Ultimate Team Set, Mar. 2, 2015, http://ultimateteamset.com/howtogradeabaseballcard.html, Retrieved online on Sep. 7, 2023, and https://web.archive.org/web/*/http:/ultimateteams.

Feng, Vincent. "An Overview of ResNet and its Variants". Towards Data Science, Jul. 15, 2017, https://towardsdatascience.com/an-overview-of-resnet-and-its-variants-5281e2f56035, 18 pages.

Halperin, J., "Computer Grading". CoinGrading.com (1999); https://coingrading.com/compgrade1.html, Retrieved on Jul. 20, 2023, 2 pages.

He, Kaiming et al. "Deep Residual Learning for Image Recognition". arXiv:1512.03385, Dec. 10, 2015, 12 pages.

International Preliminary Report on Patentability for International Application No. PCT/US2022/017010, mailed Aug. 31, 2023, 9 pages.

International Search Report and Written Opinion for International Application No. PCT/US2022/017010, mailed Jun. 10, 2022, 10 pages.

Lagerstrom, R., et al., "Objective Image Based Grading of Opal Gemstones". The 2010 International Conference on Image Processing, Computer Vision, and Pattern Recognition, Las Vegas, Nevada, USA, Jul. 12-15, 2010, https://publications.csiro.au/publications/publication/Plcsiro:EP101733, Retrieved on Jul. 20, 2023, 2 pages.

Nepal, Prabin. "VGGNet Architecture Explained". Analytics Vidhya, Jul. 30, 2020, https://medium.com/analytics-vidhya/vggnet-architecture-explained-e5c7318aa5b6, 5 pages.

Simonyan and Zisserman. "Very Deep Convolutional Networks for Large-Scale Image Recognition". arXiv preprint arXiv:1409.1556, Apr. 10, 2015, 14 pages.

Office Action for U.S. Appl. No. 17/674,328 (dated Mar. 20, 2024).

"PSA Offers Easy Way to Sell Set Registry CardsVia Collectors Corner", https://www.psacard.com/articles/articleview/8178/psa-offers-easy-way-sell-set-registry-cards-via-collectors-corner (dated May 15, 2014).

"The 4 C's of a diamonds", http://www.goldsmithlf.com/Diamonds.html (Wayback machine dated Jan. 10, 2007 through Dec. 11, 2023).

Mardons Jewelers at the Mission Inn, "Gemology 101", https://mardonjewelers.com/gemstones/gemology-101.php (Wayback machine dated Oct. 13, 2010 through Sep. 25, 2023).

Professional Coin Grading Service, "You asked for it and PGS Delivered" (Wayback Machine dated Oct. 31, 2013 through Mar. 7, 2024).

Professional Sports Authenticator, Population Report, http:www.psacard.com/pop/SubCategory.aspx?c=20003 (Wayback Machine dated Feb. 25, 2008 through Sep. 19, 2020).

Professional Sports Authenticator, Population Report, http:www.psacard.com/POP/Default.aspx (Wayback Machine dated Feb. 13, 2003 through Jan. 18, 2022).

Professional Sports Authenticator, Population Report, http:www.psacard.com/POP/Detail.aspx?c=102355 (Wayback Machine dated Sep. 15, 2015).

(56) References Cited

OTHER PUBLICATIONS

European Search Report and Written Opinion, EP Application No. 21848631.4, dated Jul. 8, 2024, pp. 1-12.
Liberty Street Software, "CoinManage 2006 Getting Started Guide," 1-53 (2006).
Jewelry Notes, "What is VVS Diamond Clarity and When Should you Choose it?" WaybackMachine, https:/www.jewelrynotes.com/what-is-vvs-diamond-calrity-and-when-should-you-choose-it/ (Jan. 17, 2013-May 22, 2024).
International Search Report and Written Opinion on corresponding PCT Application (PCT/US/2021/044066) from International Searching Authority (KIPO) dated Nov. 19, 2021.

\* cited by examiner

IDENTIFYING AND GRADING SYSTEM AND RELATED METHODS FOR COLLECTIBLE ITEMS

CROSS-REFERENCE TO RELATED APPLICATION

This is a Continuation Application of Ser. No. 17/390,751, filed Jul. 30, 2021, which is a regular utility of provisional application No. 63/059,835, filed Jul. 31, 2020, the contents of which are expressly incorporated herein by reference.

FIELD OF ART

The present disclosure is generally directed to a system for identifying and grading collectable items, such as baseball cards, game cards, and coins, and related methods. Specific discussions on automated evaluation system with machine learning having programmed protocols for imaging the collectable items and then identifying characteristics of the imaged items for classifying, storing for historical perspective, and grading.

BACKGROUND

Collectable items such as sport cards, trading cards, game cards, stamps, and coins, are examples of collectable items collected by hobbyists for both tangible and intangible values. While intangible values may not be as readily measurable, tangible values can, such as based on rarity or vintage of a particular trading card and the condition of the card.

Third-party services are available for grading collectable cards for authenticity and condition. Typically, when a card is sent to a grade service provider to be graded, the third party service provider inspects the card, ranks the card for condition, typically on a number scale, seals the card in a tamper-evident holder, and assigns a serial number to the card along with information about the card for future reference.

Once a card has been graded by a reputable third-party grader, authenticity and condition of the card are backed by the reputation of the third-party grader, thus removing any subjectivity of self-assessment. Consequently, the value of the card is typically increased thereby. However, the number of human graders is limited and the demands for grading services can often cause months of backlog.

SUMMARY

Aspects of the invention comprises an automated evaluation system that uses artificial intelligence (AI) that have been trained to analyze collectable cards for various parameters and authenticity. The AI model can also provide a first-pass grade for each analyzed collectable item or card. The first-pass grade may be used to assist with evaluation of the analyzed card with the final grade of the analyzed card to have human grader input.

In exemplary embodiments, the automated evaluation system comprises a robotic arm comprising a plurality of independently movable arm segments and a robotic hand; at least one infeed hopper comprising a receiving a space for receiving one or more sleeved collectable items; at least one completed hopper comprising a receiving a space for receiving one or more sleeved collectable items; a working platform for supporting a sleeved collectable item located adjacent the robotic arm; a camera spaced from the working platform for taking one or more images of a sleeved collectable item; and one or more sensors for detecting sleeved collectable items located in the at least one infeed hopper and the at least one completed hopper.

The automated evaluation system can comprise a housing and a light fixture mounted within the housing for providing backlight for the camera. In some examples, front light fixtures for front lighting can also be provided. The housing can have frames and/or panels and a working surface for which to mount various components.

In alternative examples, scanners may be used to capture images of the front and back of cards to be analyzed by the automated evaluation system or card identifying and inspecting system. In yet other examples, front and back images may be acquired or generated by user mobile phones or other handheld devices and then transferred to the automated evaluation system, such as saved to the Cloud, for analysis by the automated evaluation system.

The system can comprise a flipping mechanism for flipping a sleeved collectable item located on the working platform. This allows the sleeved collectable item to be imaged on both sides of the collectable item, which can embody any number of collectable items such as trading cards, game cards, sports cards, coins, and stamps.

In other examples, the system can comprise an imaging system, such as a camera a scanner, for imaging the front and back of collectable cards and a computer system running a card inspection AI model to inspect and analyze cards for various features and parameters, but wherein the cards to be imaged are retrieved, flipped, and transferred manually without a robot arm.

The system can include two or more independently movable infeed hoppers.

The system can comprise two or more independently movable completed hoppers.

The system can comprise a control computer comprising a database having a plurality of images taken by the camera. The computer can include advanced learning software, also known as artificial intelligence, for training and refining processes and decision making within a set of tasks or sub-tasks.

The database can be stored locally or remotely on the cloud, and accessible by the control computer. The database can alternatively be saved on an external hard drive or a data disk located locally with the control computer.

One or more sensors can be provided to detect the location presence of the hoppers and sleeved collectable items. In an example, a sensor is provided for each hopper used with the automated evaluation system.

The system can pick up a second sleeved collectable item for imaging while the first sleeved collectable item is being imaged with a camera.

The present invention is directed to a method as shown and described with reference to one of FIGS. 3-8.

A further aspect of the invention is a method of obtaining images of a collectable item. The method can comprise: placing a collectable item into a first plastic sleeve to form a sleeved collectable item; placing the sleeved collectable item into a receiving space of a hopper; placing a barcode representative of an order into a second plastic sleeve to form a sleeved barcode order information; placing the sleeved barcode order information on top of the sleeved collectable item; moving the sleeved barcode order information with a robotic arm onto a working platform; and detecting information on the barcode with a camera.

The method can further comprise moving the sleeved collectable item with the robotic arm onto the working platform and activating the camera to take one or more images of the sleeved collectable item.

A still aspect of the invention includes a method of issuing a first pass grade for a collectable item. The method comprising: placing a collectable item into a first plastic sleeve to form a sleeved collectable item; placing the sleeved collectable item into a receiving space of a hopper; moving the sleeved collectable item with a robotic arm onto a working platform; activating a camera to obtain one or more images of the sleeved collectable item; and issuing a grade for the sleeved collectable item based on the one or more images taken of the sleeved collectable item.

The method further comprises generating a final grade for the collectable item being imaged and analyzed by the AI model, the final grade being performed by a human grader.

A automated evaluation system for identifying and grading collectable items comprising: at least one infeed hopper comprising a receiving a space for receiving one or more sleeved collectable items; at least one completed hopper comprising a receiving a space for receiving one or more sleeved collectable items; a working platform for supporting a sleeved collectable item; a camera or a scanner spaced from the working platform for taking one or more images of a sleeved collectable item; and a control computer comprising at least one hardware processor and a memory having stored thereon an artificial intelligence model for analyzing images of sleeved collectable items acquired by the camera or the scanner.

The system can further comprise a robotic arm comprising a plurality of independently movable arm segments and a robotic hand.

The system can further comprise one or more sensors for detecting sleeved collectable items located in the at least one infeed hopper and the at least one completed hopper. The sleeved collectable items can be sleeved collectable cards, such as trading cards.

The system can further comprise a housing and light fixture mounted within the housing for providing backlight for the camera.

The system can further comprise a flipping mechanism for flipping a sleeved collectable item located on the working platform.

The at least one infeed hopper can comprise two or more independently movable hoppers.

The at least one completed hopper can comprise two or more independently movable hoppers.

The system can further comprise a database having a plurality of images taken by the camera or the scanner.

The database can be stored remotely or on an external memory drive or disc and accessible by the control computer.

The database can be stored on the memory of the control computer.

The memory can have stored thereon instructions that when executed by the at least one hardware processor cause the at least one hardware processor to perform steps comprising: a) accessing a first image and a second image from the database, the first image comprising a front side image of a first sleeved collectable item and the second image comprising a back side image of the first sleeved collectable item; b) accessing a trained convolutional neural network (CNN) from the memory, the trained CNN having been trained on collectable item images in which each of the collectable item has at least two collectable item parameters; c) generating and outputting a score for each of the at least two collectable item parameters; and d) generating a first-pass grade for the first sleeved collectable item based on analyses of the first image and the second image by the convolutional neural network.

The first sleeved collectable item can be a first sleeved collectable card.

The system can generate and output a score for authenticity for the first sleeved collectable card.

The at least two parameters can comprise an edge parameter and a corner parameter.

The at least two parameters can comprise a color parameter and a surface parameter.

The at least two parameters can comprise a sharpness parameter and a scratch parameter.

The at least two parameters can be at least two of the following parameters: an edge parameter, a corner parameter, a color parameter, a surface parameter, a center parameter, a sharpness parameter, a print imperfection parameter, a staining parameter, a scratch parameter, a chipping parameter, and a crease parameter.

A further aspect of the invention is a method of obtaining images of a collectable item comprising: placing a collectable item into a first plastic sleeve to form a sleeved collectable item; placing the sleeved collectable item into a receiving space of a hopper; placing a barcode representative of an order into a second plastic sleeve to form a sleeved barcode order information; placing the sleeved barcode order information on top of the sleeved collectable item; moving the sleeved barcode order information onto a working platform; and detecting information on the barcode with a camera.

The method can further comprise moving the sleeved collectable item with a robotic arm onto the working platform and activating the camera to take one or more images of the sleeved collectable item.

A still yet further aspect of the invention comprises a method of issuing a first pass grade for a collectable item comprising: placing a collectable item into a first plastic sleeve to form a sleeved collectable item; placing the sleeved collectable item into a receiving space of a hopper; moving the sleeved collectable item with a robotic arm onto a working platform; activating a camera to obtain one or more images of the sleeved collectable item; and issuing a grade for the sleeved collectable item based on the one or more images taken of the sleeved collectable item.

In alternative embodiments for the various processes discussed herein, the collectable items or cards can be imaged outside of a sleeve or without a sleeve and then subsequently placed into a sleeve to proceed with the evaluation. Thus, where a sleeved collectable item is discussed, it is understood that the card located inside the sleeve can first be imaged without the sleeve. In still yet other examples, the process can proceed without ever placing the collectable card or item inside a sleeve. For example, the card can be imaged on the front and back sides and then placed directly into a clear protective housing with a final grade without first being placed inside a sleeve.

A method of issuing a first pass grade for a collectable item comprising: moving a collectable item manually onto a working platform; activating a camera to obtain one or more images of the collectable item; issuing a first pass grade for the collectable item based on analyzing the one or more images of the collectable item with an AI model; issuing a final grade for the collectable item based manual evaluation of the one or more images of the collectable item or on evaluation of the collectable item; and wherein the first pass grade and the first final grade are the same or are different.

The method wherein the first final grade can be performed by a first grader and wherein a second final grade for the collectable item can be generated based manual evaluation of the one or more images of the collectable item or on evaluation of the collectable item by a second grader if the first final grade is different from the first pass grade.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of a robotic system for identifying and grading collectable items and components thereof provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
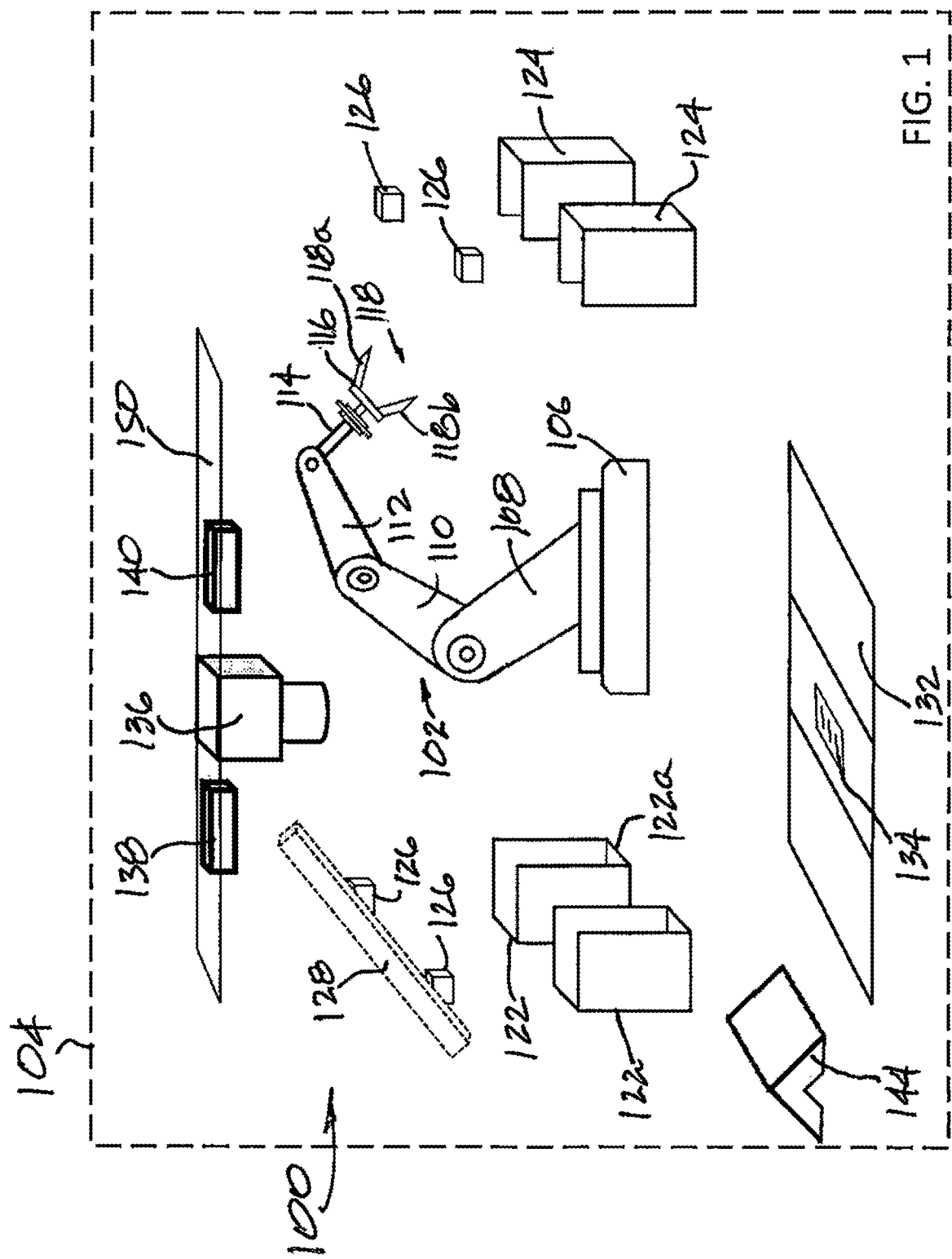
FIGS. 1 and 2 are schematic depictions of an automated evaluation system for obtaining images of sleeved collectable items and for issuing first pass grades for the sleeved collectable items.

With reference now to FIG. 1, a block diagram showing an embodiment of an automated evaluation system for analyzing, identifying, and/or inspecting collectable items in accordance with aspects of the invention shown, which is generally designated 100. In the example shown, the automated evaluation system or card identifying and inspecting system 100 comprises a robot arm or robot 102 located within a housing 104, which can have a frame and panels forming support surfaces for supporting the various components of the automated evaluation system 100. As shown, the robot arm 102 includes a base 106 and one or more arm segments or sections 108, 110, 112 connected to one another via motorized articulating joints.

A robot hand 116 comprising one or more fingers 118 is provided at the end of the robot arm 102, which is attached to the robot arm via a movable end joint 114 that can be configured to rotate along an axis and tilt. As shown, the hand 116 has a first finger 118a and a second finger 118b, which can comprise more than two fingers, such as three or four fingers. The fingers 118 can be fixed fingers, can move in and out closer and further to one another to grip an object, or can be articulating, such as having fingers with two or more movable finger segments, capable of conforming so as to better grip an object. In various embodiments, the hand 116 may employ one or more suction ports in communication with a suction source. The suction ports can contact a surface, such as a card sleeve, and can lift or otherwise manipulate the surface via a vacuum suction. Other configurations of the robot arm are contemplated.

At least one infeed hopper 122 and at least one completed hopper 124 are provided with the automated evaluation system 100, with two or more infeed hoppers and two or more completed hoppers contemplated. Each hopper 122, 124 is understood to have a structure with a storage space for storing or holding a sleeved collectable object. In the example shown, each hopper can be viewed as a holding bin having a plurality of sides and one or more access openings, such as open sides, for holding a stack of collectable items, such as a stack of trading cards to be moved by the robotic arm 102 and processed by the robotic system 100. For example, and as further discussed below, collectable cards sent in by collectors for grading can each be placed in a plastic sleeve, if not already in a plastic sleeve, by a worker to generate sleeved collectable items or cards. The sleeved cards are then stacked inside the infeed hopper 122 until filled to a desired height. Optionally, an infeed hopper 122 is filled good cards from discreet numbers of requesters or customers, such as from one to fifty customers. For example, an infeed hopper is filled with 68 sleeved cards from customer #344. Then another infeed hopper is filled with 14 sleeved cards from customer #356, 27 sleeved cards from customer #357, and 5 sleeved cards from customer #358. Then the next infeed hopper 122 is loaded with additional sleeved cards to be graded and so forth. The robot arm 102 is programmed to process each infeed hopper 122, one card at a time, until completion and then moving on to the next infeed hopper to process, and so forth. Each empty infeed hopper 122 is then filled with additional cards to be processed by the robotic arm 102 and the automated evaluation system 100.

As further discussed below, the processed sleeved cards, after being imaged, are placed inside a completed hopper 124. Once a completed hopper is filled with processed sleeved cards, the robot arm then places the next completed sleeved card in a next available completed hopper 124, and so forth. Workers can empty a filled completed hopper 124, filled to a selective height, for further processing, such as to place processed sleeved cards inside a more permanent rigid plastic housing and then labeling the rigid plastic housing with a collectable card secured therein with an identifier. The robotic arm 102 can pick up each collectable item to be processed via accessing the access openings of the respective infeed hopper 122 and then placing the processed item inside a completed hopper 124 via accessing the access openings of the completed hopper. In some examples, each order for grading, which can comprise a request to grade one or more collectable items, can be located in its own hopper so that each infeed hopper represents a single order from a single requester. Similarly, each completed hopper can hold one or more sleeved collectable items for specific order or orders only. In some examples, each infeed hopper 122 and each completed hopper 124 can have more than one order, and wherein each order from a customer or requester can comprise one or more collectable items or cards.

As further discussed below, each infeed hopper 122 can comprise multiple cards from one requester or from multiple requesters, with each request from a requester referred to as an order. For example, order #1 can comprise ten (10) cards to be graded, order #2 can comprise fifty-five (55) cards to be graded, and order #3 can comprise one (1) card to be graded, etc. Each order can be assigned an order identifier (ID), such as a barcode or a quick response (QR) code. The cards to be graded can be stacked by order numbers with each order separated from the next by a separator, such a divider. The divider can be identified with the order ID so that the robot arm 102 and the worker can identify and track the cards to be graded by order ID. In an example, the divider can be a barcode or QR code printed on a stock paper and placed inside a sleeve. A divider can alternatively be a machine readable identifier, such as a symbol or a tab, that lets the automated evaluation system knows that a new or different order from the analyzed order is up next.

A plurality of sensors 126 can be located above the hoppers 122, 124 to provide feedback to the robot arm 102 as to the locations of the hoppers, whether the hoppers contain sleeved cards, and how high the stacks of cards are in each of the hoppers, among others. For example, proximity sensors may be used to sense the location of the hoppers. The information provided by the sensors is used by the robot arm 102 to move the sleeved cards between the hoppers to process the cards, as further discussed below. The sensors 126 can be mounted on brackets 128 located within the housing 104 or to brackets that formed part of the housing frame.

A working platform 132 can be provided for placing a sleeved card 134 thereon by the robot arm 102 after the sleeved card 134 is removed from one of the infeed hoppers 122 by the robot arm 102. The sleeved card 134 is shown in schematic and can represent any number of possible collectable items located inside a sleeve, such as a sports card, a trading card, a YUGIOH card, a movie card, such as a Star War collector card, a coin, a stamp, etc. For purposes of the following discussions, the sleeved collectable item can be a sleeved collectable card. The sleeved card 134 has a front side and a back side, or a first side and a second side. The robot arm 102 can pick up the sleeved card 134 from the first infeed hopper 122a, as an example, and then place the sleeved card 134 onto the working platform 132 with the front side or first side of the sleeved card facing upward, to face the camera 136. The camera can be a high-resolution digital color camera with a fixed focal length camera lens to acquire a desired field of view from a mounted or fixed working distance with reference to a focal plane, such as the surface of the sleeved card when the sleeved card is placed onto the working platform. In some examples, the lens can be a liquid lens that contains small cells containing optical ray liquid that changes shape when a voltage is applied, thus allowing fast electronic focusing that can change the focal lengths of the lens and therefore the depth of field and the focus point of the lens, thus enabling the same camera to capture collectable items of different heights or distances to the camera lens. In an example, the working platform 132 can have more than one designated location for placement of the sleeved card. As shown, the working platform 132 has three designated locations with the sleeved card 134 being placed in the middle designated location. In other examples, there can be a different number of designated locations, such as two or more than three. The different locations can also be on different elevations. A sleeved card can be placed in any of the designated locations on the working platform and more than one sleeved card can be placed on the working platform at a time.

One or more images of the front side of the sleeved card 134 can be taken by the camera 136 located directly above the sleeved card 134. For example, two or more images can be taken of the front side of the sleeve card, for example three images, five images, or ten images. The images can be enhanced using one or more light fixtures 138, 140 for generating different lighting conditions for obtaining a set of images to facilitate processing of the sleeved card 134, as further discussed below. Alternatively or additionally, the light fixtures can be placed below the sleeved card, below the camera, to generate backlighting or backlight during the imaging. Backlighting allows the system to better evaluate edges of the sleeve card 134 from surfaces or areas that do not form part of the card from the images taken. Thereafter, the sleeved card 134 is flipped by a flipping mechanism or flipping device 144 and placed back onto the working platform 132 with the back side of the sleeved card facing upward, such as facing the camera 136. One or more images, such as two or more images, of the back side or second side of the sleeved card 134 can be taken by a camera 136, under different lighting conditions produced by the light fixtures 138, 140, including with backlighting.

In some examples, while the sleeved card 134 is being imaged on the front side and the back side of the sleeved card by the camera 136, the robot arm 102 moves to the infeed hopper 122 to retrieve a second sleeved card and then placing the second sleeved card at a second designated location on the working platform 132. Then when the first card has been imaged on both sides of the card, the robot arm 102 can pick up the first card and place the first card in one of the completed hoppers 124. During this transfer of the first card to the completed hopper 124, the first and second sides of the second card can be imaged. As this imaging process of the second card is happening, the robot arm 102 can move to the infeed hopper 122 to retrieve a third sleeved card to then take images of the first and second sides of the third sleeved card, and so forth. The camera 136 can move accordingly relative to the working platform 132 to align the camera lens with the multiple designated locations on the working platform to take images of the sleeved cards located at the different designated locations of the working platform. The process can repeat with additional cards. In other examples, the working platform 132 can move relative to the camera, which can be fixed, so that the multiple sleeved cards can sequentially be placed under the fixed camera to be imaged.

In an example, the flipping mechanism 144 can be a pick and place robot that picks up the sleeved card 134, flips the sleeved card, then places the flipped sleeved card back onto the same designated location of the working platform 132 for further imaging of the second side of the sleeved card. The flipping mechanism 144 can employ fingers, vacuum, or combinations thereof to grip or hold the sleeved card while flipping the sleeve card. The working platform 132 can be structured to cooperate with the flipping mechanism, such as incorporates cut-outs, openings, and different geometries to accommodate for the movements and requirements of the flipping mechanism.

The camera 136 and the light fixtures 138, 140 can be mounted to the same bracket 151 or to different brackets located within the housing 104, or to one or more brackets that form part of the housing 104. In various embodiments, a second or additional and/or other cameras may be incorporated with the automated evaluation system or card identifying and inspecting system 100. For example, a second camera and a second set of light fixtures can be located below the working platform 132 to take one or more images of the second side of the sleeved card at the same time as the upper camera 136 take one or more images of first side of the same sleeved card. This way, images can be taken of both sides of the sleeved card by different cameras without having to flip the card.

In various embodiments, the robot system or card identifying and inspecting system 100 uses image data generated by the camera 136, or cameras, to perform a task or a set of tasks related to authenticating and evaluating the conditions of the sleeved card 134. For example and as further discussed below, the robot arm 102 may be tasked with picking up and placing a sleeved card from an infeed hopper 122 onto the working platform 132, pausing for one or more images to be taken by the camera 136, pausing for the flipping mechanism 144 to flip the sleeved card, pausing for the camera to take additional images of the second side, and then picking and placing the sleeved card into the completed hopper 124. A processor can then be tasked with compiling the images of the sleeved card to determine parameters such as edges of the cards, staining, surface quality, and card dimensions. In an example, artificial intelligence (AI), such as machine learning (ML), is used to analyze the images for various parameters, such as for scratch, alignment, print quality, etc., as further discussed below with reference to FIGS. 3-8. Exemplary AI models include convolutional neural networks (CNNs). Preferred CNN models include the VGG16 Net and VGG19 Net models, which can be re-trained to analyze and classify collectable item defect types (such as parameters with low scores for poor quality or high scores for being pristine), collectable item classes (such as particular types or series), and/or whether the collectable items are authentic based on images of the collectable items. In particular, CNN models can be used to classify collectable card defect types, card classes, and/or whether the card is authentic based on images of the collectable cards. Other deep neural networks for image processing are contemplated, such as LeNet, AlexNet, GoogLeNet/Inception, and ResNet, ZFNet.

Figure 2:
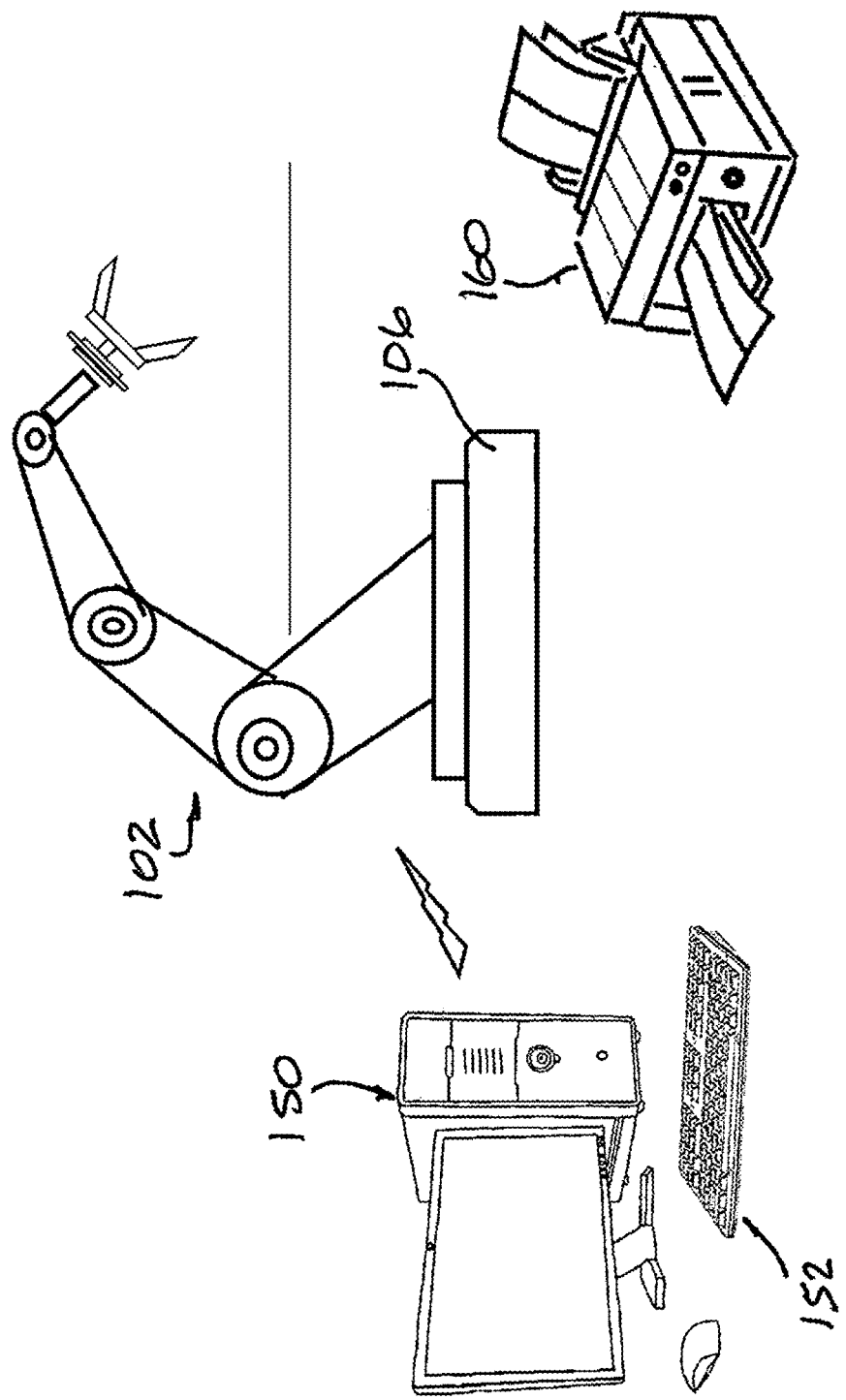

With reference to FIG. 2 in addition to FIG. 1, in various embodiments, the robot arm 102 may be tasked with different functions via a control system, such as a control computer 150. In the example shown, the control computer 150 wirelessly connects with the robot arm 102 with a wired connection contemplated. The robot arm 102 may include control elements housed in the base 106, or elsewhere, such as wireless or wired communication interface (e.g., a network interface card, WiFi transceiver, Bluetooth™ or other near field transceiver, etc.) and I/O ports for diagnostics and troubleshooting. Other components may be housed in the base 106 for transmitting instructions to the robot arm or for controlling functions of the robot arm, such as one or more processors or microcontrollers. In the example shown, a model and knowledge base is incorporated with the control computer 150, which may be used to perform tasks assigned to robot arm 102. As examples of tasks, a protocol for the robot arm 102 to determine how to drive the various motorized articulating joints to a position to perform a task or a subtask, and how to manipulate the robot hand 116 (e.g., by driving motors that then drive the arm segments or sections 108, 110, and 112, and the hand 116 to adjacent ones of each other) to perform tasks involving sleeved cards. The knowledge base may include protocols that have been trained via machine learning techniques (i.e., artificial intelligence) to enable the automated evaluation system 100 and the robot arm 102 to recognize and to base decisions and steps on image data generated by the camera 136, as further discussed below. In particular examples, the knowledge base software, or AI model, is operated on the control computer 150, which may be located locally adjacent the robot arm. In other examples, AI model can reside on a network computer, on a remote server, or on the Cloud and accessible through an App or an internet dashboard. The image data files to be analyzed by the AI model may reside on the same computer, on a different computer, on the network, on the Cloud, or on an external hard drive or data disk.

In some embodiments, if the automated evaluation system or card identifying and inspecting system 100 cannot perform a task, such as unable to determine a card category, the particular sleeved card that cannot be performed is then flagged and stored in the control computer 150 for user intervention, for further user input, or the system can alert for immediate user intervention, such as to provide manual input regarding a certain the decision that the control computer and/or the knowledge based protocol has not encountered. In various embodiments, the automated evaluation system 100 can continue to learn to recognize attributes, such as by updating its knowledge base to reflect information added to the database to retrain and/or by human intervention. For example, the AI model can be re-trained or fine-tuned to improve detection precision.

Finetuning can involve updating the CNN architecture and re-training it to learn new or different features of the different classes or different characteristics of the cards. Finetuning is a multi-step process and involves one or more of the following steps: (1) removing the fully connected nodes at the end of the network (i.e., where the actual class label predictions are made); (2) replacing the fully connected nodes with freshly initialized ones; (3) freezing earlier or top convolutional layers in the network to ensure that any previous robust features learned by the model are not overwritten or discarded; (4) training only the fully connected layers with a certain learning rate; and (5) unfreezing some or all of the convolutional layers in the network and performing additional training with the same or new datasets with a relatively smaller learning rate. In an example, finetuning is used to improve the precision for evaluating authenticating, and checking conditions, and other parameters of the of the cards to be analyzed, such as those listed with reference to FIG. 5.

In embodiments, a task or set of tasks may be assigned to the automated evaluation system or card identifying and inspecting system 100 via a user interface 152 connected to the control computer 150. For example, a technician may provide inputs via the user interface 152 to override, append, intervene or supplement instructions sent to the robot arm 102 in the event of a glitch or to resolve a task. In some embodiments, the user interface 152 may be used to provide attributes of a sleeved card, such as by designating the card as "authentic" so that only the condition or various other factors of the card are left to be identified.

In various embodiments, one or more of the automated evaluation systems 100 and one or more control computers 150 may include control logic to determine attributes of the various sleeved cards with respect to which tasks are to be performed, such as evaluating a card's edge quality and dimensions only and not its colors. For example, the AI model can be programmed to only look at certain requested features rather than all the features that the AI model has been trained to perform. In an example, the AI model analyzes card images and output or classifies information about the card images, such as the card's border is off, the colors are off, the signature appears fake, etc., but the ultimate grading or card scoring is performed manually by one or more human graders. In an example, one or more human graders provide or give a collectable card a grade, between 1-10, using information generated by AI model, which includes analyzing images of the card using the AI model. This allows the inspection and authenticating process of collectable cards to be performed relatively quickly using one or more AI models but wherein the final grade for each of the cards is provided by one or more human graders. In some examples, the AI model is programmed to generate a first-pass grade for the collectable card represented by the analyzed images. However, a final grade for the collectable item or card can only be generated, provided, or given by one or more human graders. Less preferably, the automated evaluation system 100 of the present invention, using one or more AI models, can be programmed to generate a final card score or grade, which can be modified or adjusted by one or more human graders. The control logic for various protocols is further discussed below with reference to FIGS. 3-8.

Thus, the final grade can be understood as the only final grade if the grade matches the first pass grade. If the final grade does not match the first pass grade, then the final grade is a first final grade and a second final grade is generated by a second grader. Then the first final grade and the second final grade can form the final grade. In other examples, the final grade is defined by a third final grade or more, such as additionally with a fourth final grade and a fifth final grade.

Figure 2A:
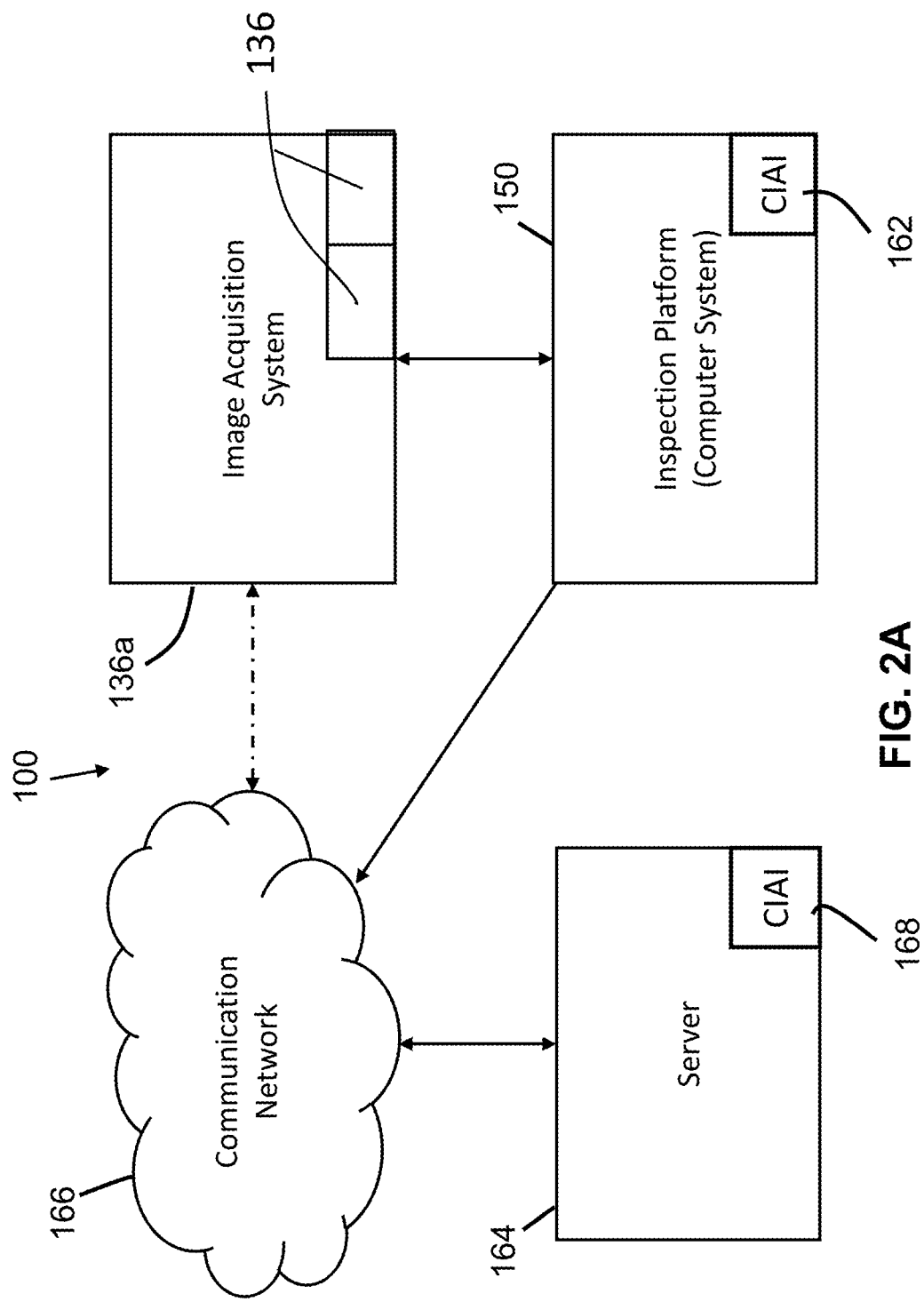
FIG. 2A is a schematic for a configuration of an automated evaluation system in accordance with further aspects of the invention.

With reference now to FIG. 2A, a schematic diagram is shown depicting the automated evaluation system 100 for automatically inspecting and detecting certain parameters and other aspects of collectable cards using image data and machine learning in accordance with aspects of the invention. A computing device or computer system 150 can receive front and back card images of each collectable card to be inspected from the camera 136. In some configurations, an image acquisition system 136a may comprise more than one camera 136 for acquiring front and back images for each collectable card to be inspected and analyzed. In some embodiments, the computing device 150 can execute at least a portion of the card inspection AI model (CIAI) 162 to inspect and automatically detect characteristics, parameters, and other aspects of collectable cards, as further discussed below. In an example, the computing device 150 has a processor that can execute a convolutional neural network (CNN) to determine whether front and back images of collectable cards represent authentic cards and/or contain one of several characteristics or parameters about the cards such as smear, colors, edge profile, etc., as further discussed below with reference to FIGS. 3-8. That is, the memory on the computing device has stored thereon or therein instructions that when executed by at least one hardware processor cause the at least one hardware processor to operate the CNNs to perform several tasks, including access data files, analyze data files, perform analysis of the data files, and provide outputs indicative of characteristics or parameters represented by the data files.

In an example, the automated evaluation system or card identifying and inspecting system 100 comprises software drivers and libraries for analyzing image data. An exemplary software driver can be the Python interpreted high-level programming language operating with a NVIDIA Cuda compiler driver compiling one of several libraries that have been modified in a process called transfer learning. The libraries can include the cuDNN SDK deep learning GPU acceleration library, TensorFlow open-source software library for developing and evaluating deep learning models, Keras open-source software library, NumPy open-source software library for working with array and matrix data structures, matplotlib open-source software library for image display and annotation, or graphs display, and OpenCV open-source library for processing card images to identify objects and characteristics. In exemplary embodiments, convolutional neural networks (CNNs) are used as deep-learning models for vision applications to inspect and classify a plurality of characteristics and parameters of card images of collectable cards. In using and training a CNN model, the learned pattern in a certain location of an image, as an example, can be recognized anywhere else in the image. Initial convolutional layers can learn small local patterns, such as edges and textures of a card image, whereas later layers can learn larger patterns made of features learned by the initial layers.

In some embodiments, the computing system 150 can communicate information about the image data received from the image acquisition system 136a to a server 164 over a communication network 166, which can execute at least a portion of the CIAI model 168. In such embodiments, the server 164 can return information to the computer system 150, the information indicative of an output of the CIAI model 168, which can be one of several characteristics or parameters of a card gleaned from at least two images of the card, its front or first surface image and its back or second surface image.

In some embodiments, the computing device 150 and/or the server 166 can be any suitable computing device or combination of devices, such as a desktop computer, a laptop computer, a smartphone, a tablet computer, a wearable computer, a server computer, a virtual machine being executed by a physical computing device, etc. In some embodiments, the CIAI models 162, 168 can classify characteristics or parameters of collectable cards, using convolutional neural networks (CNNs) previously trained as a general image classifier.

In some embodiments, the image acquisition system 136a of FIG. 1 is the image source for supplying image data to the computer device 150 and/or to the server computer 164. The image acquisition system 136a can alternatively or additionally include an image scanner 510 (FIG. 9) for scanning front and back surface images of collectable cards to be analyzed by the system. In some embodiments, the image acquisition system 136a with one or more cameras 136 can be housed locally with the computing device 150. For example, the image acquisition system 136a can be incorporated with the computing device 150. In other words, the computing device 150 can be configured as part of a device for capturing and/or storing images from the image acquisition system 136a, such as for storing data files captures by the cameras. In another example, the image acquisition system 136a can be connected to the computing device 150 by a cable, a direct wireless link, etc. Additionally or alternatively, in some embodiments, the image acquisition system 136a can be located locally and/or remotely from computing device 150 and can communicate image data to the computing device 150 and/or to the server 164 via a communication network 166. In alternative embodiments, a user or customer can acquire front and back surface images of a collectable card and then transmit the acquired images to the computing device 150, to the remote server 164, or to the Cloud for use by the system 100 to analyze and inspect the images.

In some embodiments, the communication network 166 can be any suitable communication network or combination of communication networks. For example, communication network 166 can include a Wi-Fi network (which can include one or more wireless routers, one or more switches, etc.), a peer-to-peer network (e.g., a Bluetooth network), a cellular network (e.g., a 4G network, a 4G network etc., complying with any suitable standard, such as CDMA, GSM, LTE, LTE Advanced, WiMAX, etc.), a wired network, etc. In some embodiments, the communication network 166 can be a local area network, a wide area network, a public network (e.g., the Internet), a private or semi-private network (e.g., a corporate intranet), any other suitable type of network, or any suitable combination of networks. Communications links can be any suitable communications link or combination of communications links, such as wired links, fiber optic links, Wi-Fi links, Bluetooth links, cellular links, etc.

In some embodiments, communications systems for providing the communication network 166 can include any suitable hardware, firmware, and/or software for communicating information over communication network 166 and/or any other suitable communication networks. For example, communications systems can include one or more transceivers, one or more communication chips and/or chip sets, etc. In a more particular example, communications systems can include hardware, firmware and/or software that can be used to establish a Wi-Fi connection, a Bluetooth connection, a cellular connection, an Ethernet connection, etc.

Figure 3:
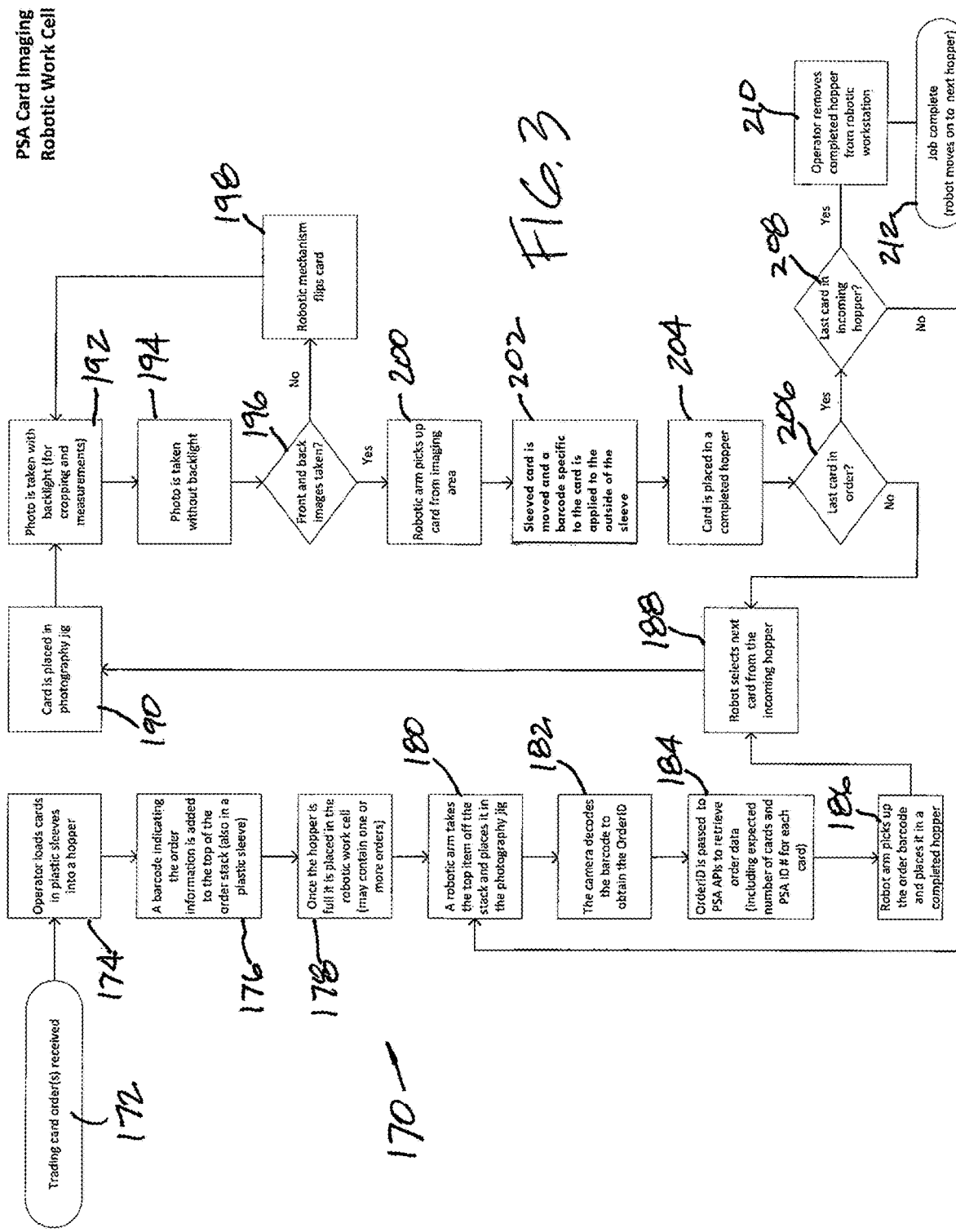
FIG. 3 is flow diagram depicting a process for taking images of incoming collectable items and issuing a barcode and a unique identifier for each sleeved collectable item.

FIG. 3 is a schematic diagram representing a protocol for imaging incoming trading cards using the automated evaluation system of FIGS. 1 and 2 so that the captured images may be used or processed in other subsequent processes for evaluating authenticity, conditions, and other parameters of the incoming cards. The protocol can include utilizing a printer 160 (FIG. 2) to print a barcode and a unique identifier for placement on each of the processed card. Alternatively, a QR code may be used instead of or in addition to the barcode. The imaging protocol or process 170 starts with receiving orders from customers at 172 to grade cards, or other collectable items, sent into the grading service provider. Each order can vary from one card to hundreds of cards to be evaluated. An operator then loads the cards at 174 in plastic sleeves to form sleeved collectable cards or sleeved cards for short. In an example, each card to be evaluated is individually sleeved. The sleeved cards are then placed into an infeed hopper 122 (FIG. 1), which can be located outside of the automated evaluation system housing 104 (FIG. 1) or cell until the hopper is full, or to a desired height or for a designated number of orders, such as for one order or for two or more orders. The user then loads additional sleeved cards into the next infeed hopper. When an infeed hopper is full, or to a desired height or orders, the user then places the filled infeed hopper into the cell or housing of the automated evaluation system for processing. Foreseeably, a belt or conveyor can deliver a filled infeed hopper from the filling station or area to the cell for processing by the automated evaluation system.

In alternative embodiments, the collectable items or cards can be imaged outside of a sleeve or without a sleeve and then subsequently placed into a sleeve to proceed with the evaluation. Thus, where a sleeved collectable item is discussed, it is understood that the card located inside the sleeve can first be imaged without the sleeve. In still yet other examples, the process can proceed without ever placing the collectable card or item inside a sleeve. For example, the card can be imaged on the front and back sides and then placed directly into a clear protective housing with a final grade without first being placed inside a sleeve.

A barcode, to be broadly construed to cover a QR include, indicating the order information is added at 176 to the top of the order stack. The barcode can be printed on a card or a paper stock and can be placed inside a sleeve to form a sleeved order information barcode card or sleeved OrderInfo card. Each order information barcode can be tied to an OrderID that contains information about an order, such as how many cards are in the order and information about the requester, as further discussed below.

At 178, the user places the infeed hopper into the cell or housing 104 of the robot system or card identifying and inspecting system 100 after the infeed hopper is full or after a designated number of sleeved cards are placed therein. Each infeed hopper can have more than one order with each order separated by an information order barcode or OrderID. In other examples, each hopper is specific to one order. For discussion purposes, the different information order barcodes can be thought of as OrderID1, OrderID2, OrderID3, etc.

At 180, the robotic arm 102 (FIG. 1) takes the top sleeved card from one of the infeed hoppers 122 off the stack and places the item onto one of the designated locations of the photography jig or working platform 132 (FIG. 1). For purposes of discussions, the first sleeved item can be assumed to be the information order barcode or sleeved OrderInfo card. As further discussed below, alternative embodiments include forgoing the robotic arm and manually transferring sleeved cards and sleeved OrderInfo cards onto the photography jig or working platform, or to a scanner, for imaging and then manually moving the imaged sleeved cards and sleeved OrderInfo cards to the outfeed hoppers for further processing.

The camera 136 (FIG. 1) then decodes the barcode to obtain an OrderID stored in the control computer 150 (FIG. 2) or elsewhere, such as on the Cloud or a local server, at 182. For example, the camera scans the barcode to acquire data stored into the barcode.

The OrderID is then passed to an application program interface (API) to retrieve order data associated with the particular OrderID at 184. The order data can include such information as the name of the requester, the number of cards associated with the order, and the grading provider's ID No. assigned to each card in the order.

The robot arm 102 then picks up the order barcode, such as the sleeved OrderInfo card, and places it in a completed hopper 124 (FIG. 1) at 186. The robot arm then picks up the next sleeved card from the incoming hopper at 188 and places the sleeved card onto the photography jig or working platform 132 (FIG. 1) to be imaged at 190.

The camera 136 (FIG. 1) is activated to take one or more images of the sleeved card at 192. The light fixtures 138, 140 can also be illuminated to provide backlighting during the imaging. Backlighting can comprise a light source or sources located on the side of the card opposite the camera. At 194, one or more images are taken of the sleeved card without the backlight. The card is then flipped so that the second side of the card is taken. The same number and image settings can be taken of the second side, including with and without backlight. In other examples, backlight is not required when taking images of the second side or backside.

At 196, the protocol queries whether images have been taken for both the front and back of the cards. In some examples, only one image of the front and one image of the back are taken by the image acquisition device. In other examples, multiple images of the front of the card and multiple images of the back of the card, with different lighting conditions, can be taken. If not, then the card is flipped at 198 so that images can be taken. If yes, then the robotic arm picks up the card from the imaging jig or working platform at 200.

The card is moved past a printer 160 which prints a barcode specific to the sleeved card that has just been imaged and then places the barcode onto the plastic sleeve at 202. In some examples, additional information may be printed with the barcode, such as a grade, a message, a date, etc. The sleeved card that has been imaged and has a barcode specific placed onto the sleeve is then placed into a completed hopper at 204. Thus, each processed card can have a barcode and a unique identifier, such as a unique grader service provider ID, associated therewith attached to the sleeve so that each card can be tracked by the barcode and the unique identifier. In some examples, the unique identifier is printed and placed onto the sleeved card automatically, i.e., via automation. In other examples, the unique identifier is manually placed onto the sleeved card after imaging the front and back of the sleeve card.

At 206, the protocol queries whether the just imaged card is the last card of the particular OrderID, such as by detecting whether the next card in the stack has a different sleeved OrderInfo card or by tallying the total number of cards that have been imaged compared to the number of cards associated with the OrderID. If the just imaged card is not the last card, then return to 188 and repeat. If yes, the protocol queries whether the just imaged card is the last card in the infeed hopper at 208. If not, then return to 180 and repeat. If yes, then the completed hopper with the imaged sleeved card or cards is removed from the robotic workstation by the operator at 210. The robot arm can now move to the next infeed hopper and repeat at 212. Images of the card or cards of the particular OrderID are now stored in the system computer and ready to be processed, such as ready for evaluation using the AI models of the present invention.

Figure 4:
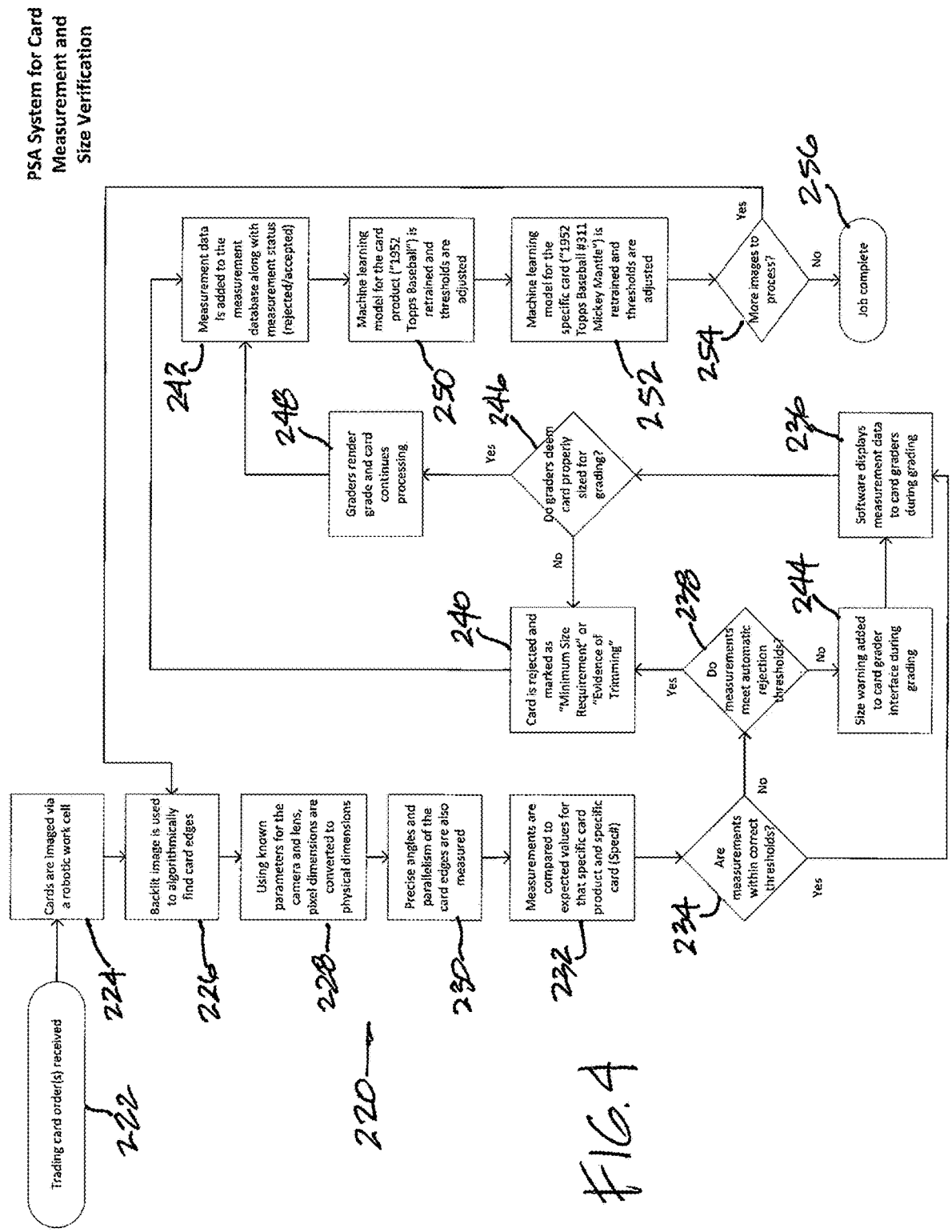
FIG. 4 is flow diagram depicting a process for obtaining measurements for each collectable item to determine if the measurements fall within a baseline for the type of card in question.

FIG. 4 is a schematic diagram representing a protocol 220 for card measurement and size verification using the automated evaluation system of FIGS. 1 and 2. The goal of this process is to check measurements of each card to determine if they fall within a baseline for the type of card in question and to reject or flag the card for closer examination if they do not. The measurements obtain are compared against existing measurement data for cards from the same type stored in the database of card images. The new measurement data is then added to the database and stored for future reference. The process starts with receiving a trading card or collectable card order for evaluation at 222, sleeving the cards, and then taking front and back images of each of the cards in the order at 224, assuming more than one card in the particular order. The images can be taken with and without backlight at 226. Steps 222, 224, and 226 can be the same as steps described with reference to FIG. 3.

At 228, using known parameters for the camera and lens, the pixel dimensions are converted to physical dimensions. Precise angles and parallelism of the card edges are also measured at 230. At 232, the measurements are compared to expected values for the specific card product and specific card, which may herein be referred to as Spec #. The system queries whether the measurements are within correct thresholds at 234. If yes, then the software displays measurement data to card graders during the grading process at 236. In an example, the measurement data is stored in a computer. When a grader then grades the imaged card at a later time, the information can be extracted to assist the grader on grading the card, without having to physically measure the card.

If the measurements are not within correct thresholds, the protocol queries whether the measurements meet an automatic rejection threshold at 238. For example, a particular card may have its edges trimmed in order to remove frayed edges. However, if the trimming is excessive, then the card dimensions can measure well below an acceptable threshold for that particular card type. If so, the card can be rejected as most collectors would not deem the excessively trimmed card desirable. Thus, if the card meets an automatic rejection threshold, then the card is rejected and marked as such at 240. In an example, the card can be marked as "Minimum Size Requirement" or "Evidence of Trimming". At 242, the measurement data of the rejected card is then added to the measurement database along with the measurement status of the card, such as rejected or accepted.

Back at 238, if the measurements do not meet the automatic rejection threshold, a size warning is then added to a card grader interface during the grading process at 244. Thus, during grading process, the grader can see the warning associated with the card and can determine whether the card is properly sized for grading at 246. If not, then the card is rejected at 240. If yes, then the grader renders a grade for the cards, such as a number between 1 and 10, and continues the process at 248. Measurement data of the now graded card by the grader is added to the database at 242.

Machine learning model, such as a CNN model, for the particular card product is retrained and the threshold values adjusted at 250. For example, if the card is a "1952 Topps Baseball" card, then threshold values for that particular type of cards are adjusted to fine tune acceptable and non-acceptable parameters. For example, the AI model can be re-trained or fine-tuned to improve detection of acceptable card edges. Finetuning can involve updating the CNN architecture and re-training it to learn new or different features of the different classes or different characteristics of the cards, such as different thresholds for acceptable card edges. Finetuning is a multi-step process and involves one or more of the following steps: (1) removing the fully connected nodes at the end of the network (i.e., where the actual class label predictions are made); (2) replacing the fully connected nodes with freshly initialized ones; (3) freezing earlier or top convolutional layers in the network to ensure that any previous robust features learned by the model are not overwritten or discarded; (4) training only the fully connected layers with a certain learning rate; and (5) unfreezing some or all of the convolutional layers in the network and performing additional training with the same or new datasets with a relatively smaller learning rate. In an example, finetuning is used to improve the precision for evaluating authenticating, and checking conditions, and other parameters of the cards to be analyzed. Thus, when that same particular card is again encountered in the future, threshold values for that particular card can better be determined.

At 254, the protocol queries whether there are more images to process. If yes, then return to 226. If no, then the process is complete at 256.

Figure 5:
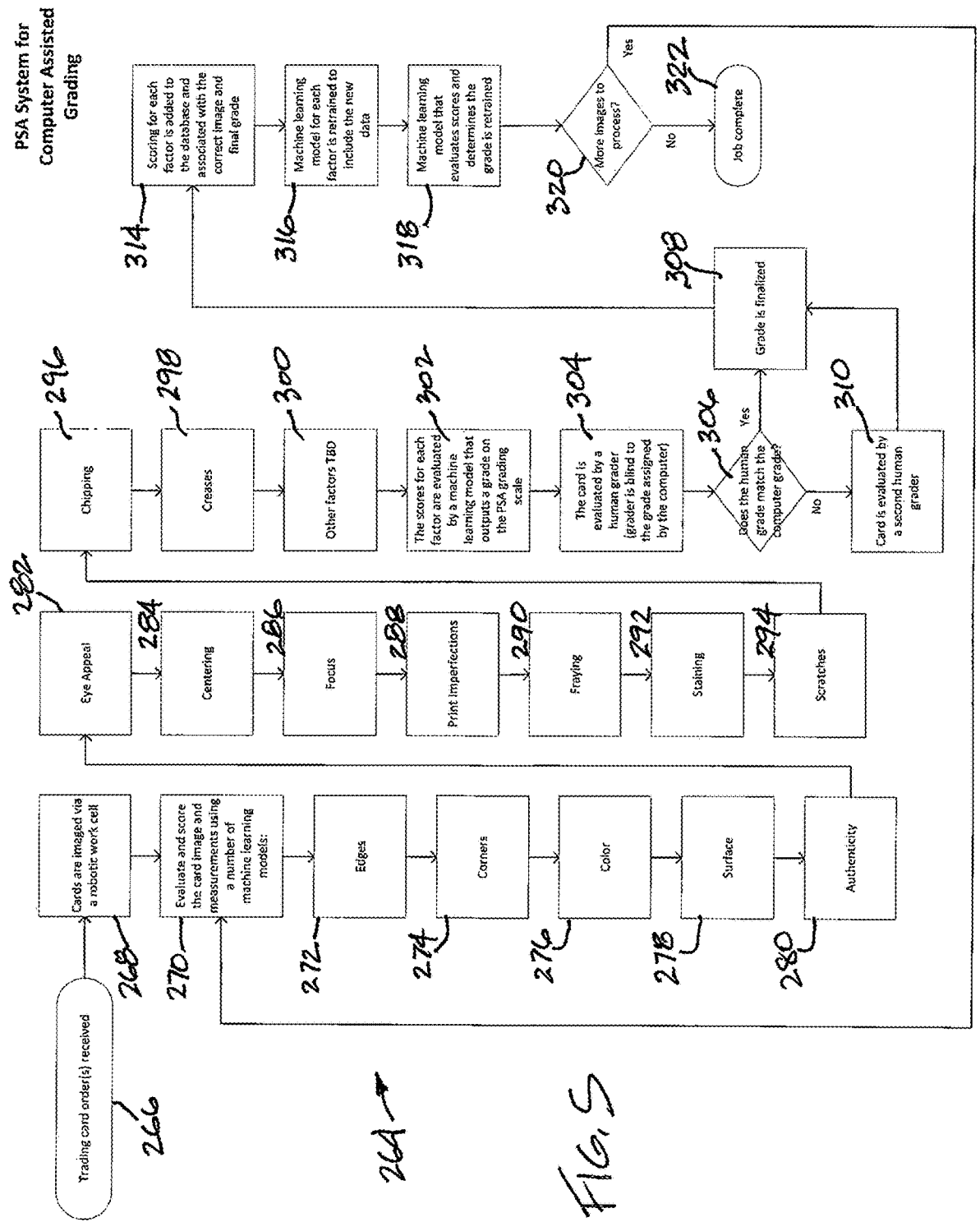
FIG. 5 is flow diagram depicting a process for teaching a computer to generate a first-pass grade for a collectable item.

FIG. 5 is a schematic diagram representing a protocol 264 for teaching a computer to generate a first-pass grade for a trading card, which can be re-checked by one or more human graders at later stages. The process attempts to have the computer render an initial opinion, which is then confirmed or rejected by one or more human graders. This can significantly reduce human grader's time per card to evaluate and grade the card and speed up the process of grading voluminous quantities of cards to be graded. The first-pass grade can be viewed as suggestive but the final grade decision for the collectable card to be graded rests entirely on one or more human graders.

The process starts with receiving a trading card order for evaluation at 266 and then taking front and back images of each of the cards in the order at 268, assuming there is more than one card in the particular order. Steps 266 and 268 can be the same as steps described with reference to FIG. 3 for receiving and process card orders. The imaged cards, which can be imaged sleeved cards, are then evaluated and provided with a score based on a number of parameters, such as measurements at step 270, which can involve steps described with reference to FIG. 4.

In addition to measurements, the protocol can evaluate other card parameters and factors, including edges, corners, color or colors, surface, authenticity, eye appeal, centering, focus or sharpness, print imperfections, staining, scratches, chipping, creases, and optionally other factors at 272-300. Each parameter or characteristic reviewed can be given a score. The scores for each factor or characteristic are evaluated by the machine learning model that outputs a grade or score on a grading scale, such as 1 to 10 at step 302. In an example, the first pass score for the collectable card can be an average score, rounded to the nearest whole number, obtained from the plurality of scores of the different factors and characteristics reviewed. In another example, one or more of the different factors and characteristics can be weighted more than others. For example, if the authenticity score is 6, its produced score from the AI model can be 1.1 times 6, or 6.6. Outputs from the AI model for the various individual factors and characteristics can be adjusted with a weight factor of 1.1 to 1.3 or higher, preferably not more than 1.5. Preferably, the authenticity, print imperfections, and centering are scaled. The scaled and non-scaled values are averaged and rounded to the nearest whole number. The card is then evaluated by a human grader at step 304. Preferably, the human grader is blind to the grade assigned to the card by the computer.

At step 306, the protocol queries whether the human grade matches the computer first-pass grade. If yes, the grade is finalized at 308. If not, the card is then graded by different human grader at 310. Human graders can confer and can issue a final score or grade that differs from the computer generated first-pass grade or score using machine learning. Less preferably, a single human grader can issue a final score that differs from the computer generated first-pass score. In some examples, a second human grader can spot check final scores of those analyzed cards that received scores from human graders in which the final scores differ from the computer generated first-pass scores. The scores for each of the evaluated factors are then added to the database and associated with the correct image and final grade at 314.

At 316, the machine learning model for each factor is retrained to include the new data, and at 318, the machine learning model that evaluates the scores and determines the grade is retrained to factor in the new data. Fine-tuning and re-training can be performed as discussed elsewhere herein.

At 320, the protocol queries whether there are more images to process. If yes, return to 270. If no, the process is complete at 322.

Figure 6:
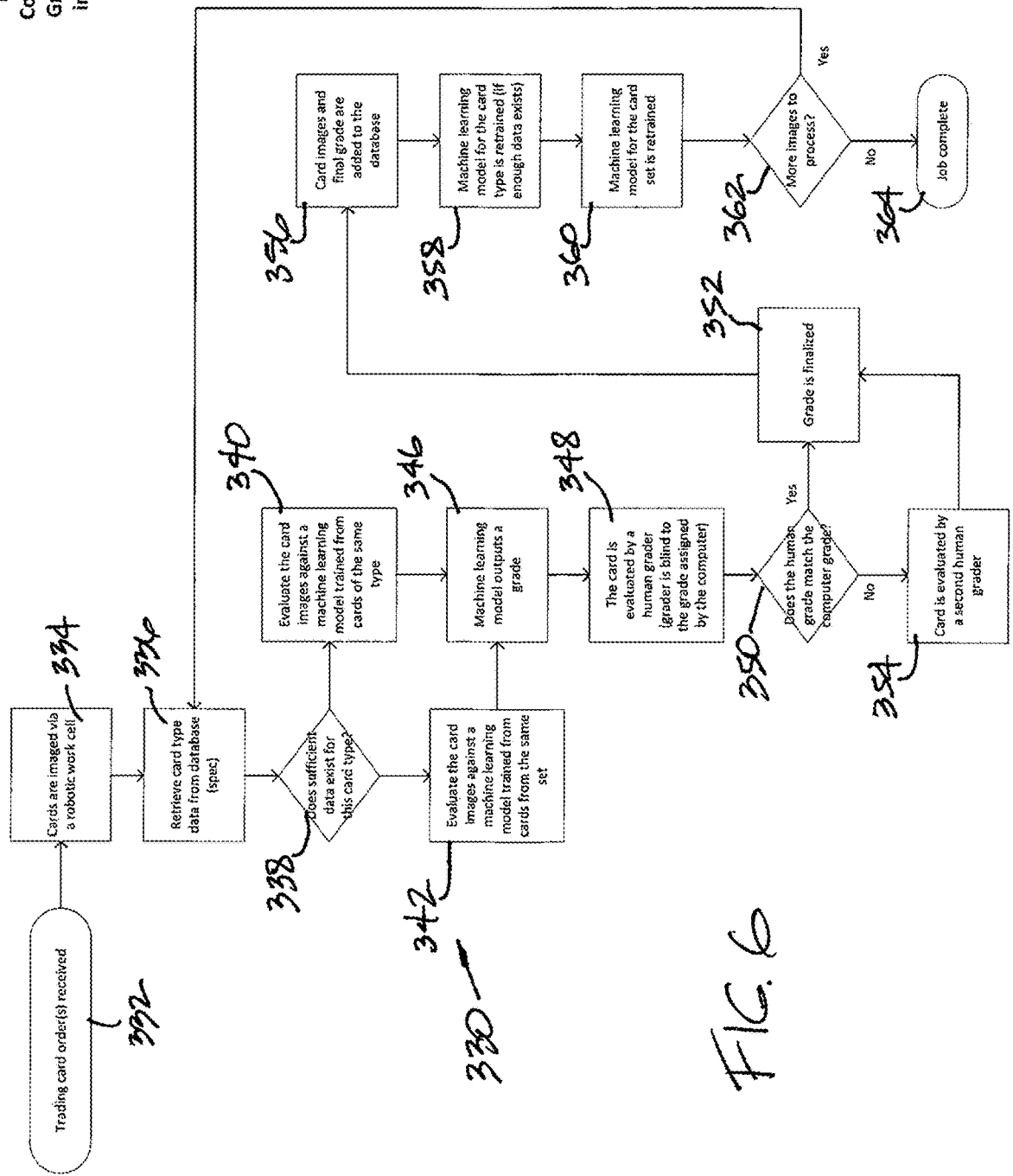
FIG. 6 is an alternative flow diagram depicting a process for teaching a computer to generate a first-pass grade for a collectable item.

FIG. 6 is a schematic diagram representing a protocol 330 for teaching a computer to generate a first-pass grade for a trading card, which can be re-checked by one or more human graders at later stages. The process of FIG. 6 can be an alternative implementation of the process of FIG. 5 or can be used in parallel with the process of FIG. 5. The process attempts to have the computer render an initial opinion, which is then confirmed or rejected by one or more human graders. This can significantly reduce human grader's time per card and speed up the process of grading voluminous quantity of cards to be graded.

The process starts with receiving a trading card order for evaluation at 332 and taking front and back images of each of the cards in the order at 334, assuming there is more than one card in the particular order. Steps 332 and 334 can be the same as steps described with reference to FIG. 3. Based on the barcode from the OrderID, card type data from the database is retrieved at 336, if available. The protocol then queries whether sufficient data exist for this card type at 338. If yes, the card images are evaluated against a machine learning model trained from images of the cards of the same type at 340. If no, then the card images from the card to be analyzed are evaluated against a machine learning model trained from cards of the same set at 342. The machine learning model then outputs a first-pass grade at 346 after evaluating the card images against either cards of the same type or same set.

The card is then evaluated by a human grader at 348 and the human grader gives the card a grade or score. Preferably, the human grader is blind to the grade assigned to the card by the computer. At 350, the protocol queries whether the human grade matches the computer-generated first-pass grade. If yes, the grade is finalized at 352. If no, the card is evaluated by a second human grader at 354. Human graders can confer and can issue a final score or grade that differs from the computer generated first-pass grade or score using machine learning. The card images and final grade are then added to the database at 356.

At 358, the machine learning model for the card type is retrained, and at 360, the machine learning model for the card set is retrained. Fine-tuning and re-training can be performed as discussed elsewhere herein.

At 362, the protocol queries whether there are more images to process. If yes, return to 336. If no, the process is complete at 364.

Figure 7:
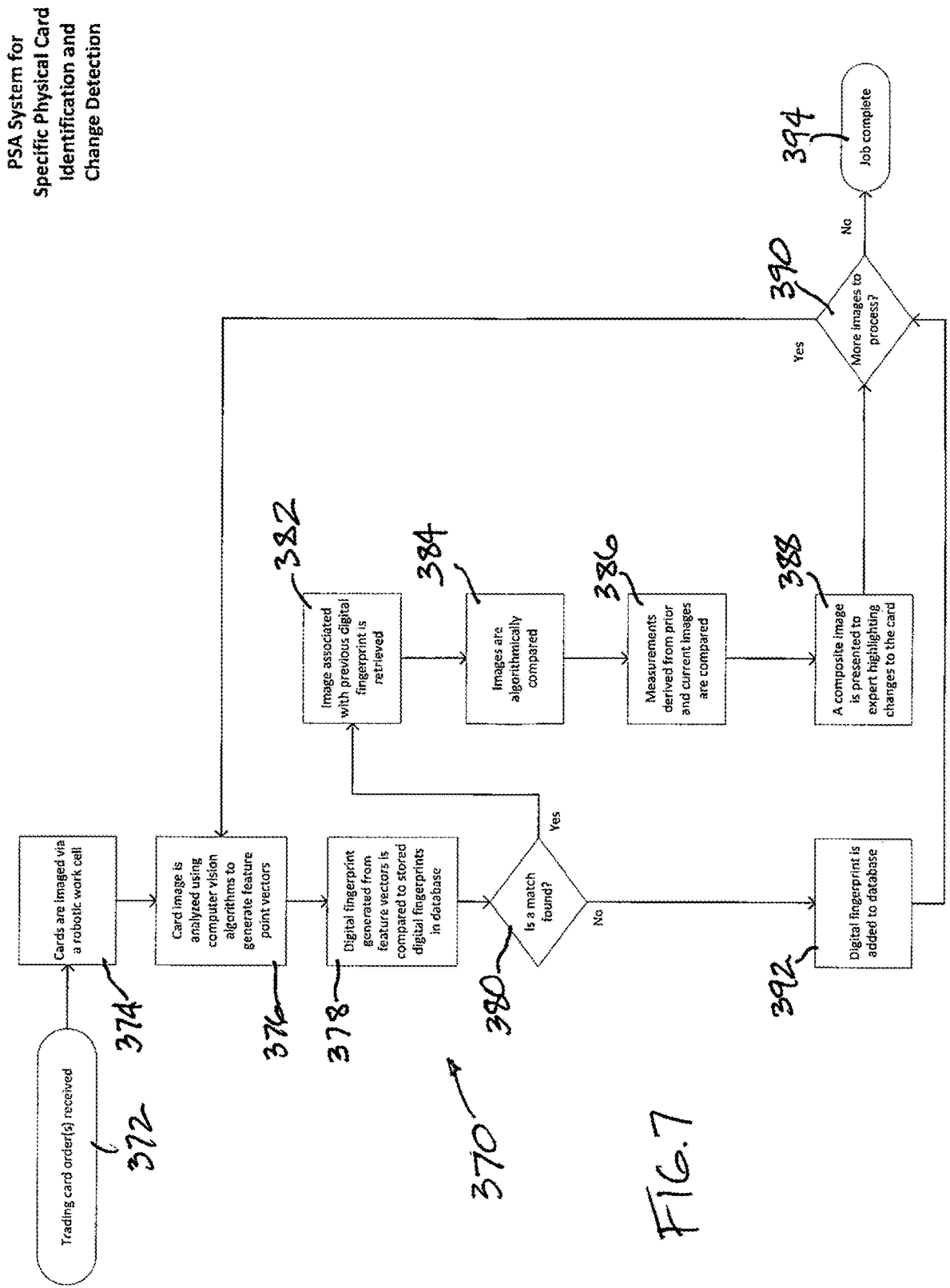
FIG. 7 is flow diagram depicting a process for determining if the collectable item to be evaluated was previously already evaluated by the grading provider.

FIG. 7 is a schematic diagram representing a protocol 370 for determining whether the card has been evaluated and data and/or images linked to the card is in the grading database. The process identifies when the card was previously evaluated and compare the previous and current state images to look for changes to the card that would indicate tampering. In an example, the incoming image data are compared with data on cards of the same Spec #. In a specific example, the card to be evaluated is a 1952 Topps Mickey Mantle #311 card. The incoming card would be compared with images on file for other 1952 Topps Mickey Mantle #311 cards. The new images and data are added to the database and will be used in subsequent searches for similar cards.

The process 370 starts with receiving a trading card order for evaluation at 372 and taking front and back images of each of the cards in the order at 374, assuming there is more than one card in the particular order. Steps 372 and 374 can be the same as steps described with reference to FIG. 3. The card images are analyzed using computer vision algorithm to generate feature point vectors at 376. A digital fingerprint generated from the feature factors is compared to stored digital fingerprints in the database at 378.

At 380, the protocol queries whether there is a match between the generated feature point vectors and stored digital fingerprints in the database. If yes, the process moves to retrieve images associated with the previously stored fingerprints at 382. The images are then algorithmically compared at 384 and measurements derived from prior and current images are compared at 386. A composite image is then generated and presented to an expert or grader to highlight changes to the card at 388. Next, the protocol queries whether there are additional images to process at 390 and return to 376 if yes, or terminate the process at 394 if no.

Meanwhile, if there is no match between the generated feature point vectors and stored digital fingerprints in the database, then the process adds the newly acquired digital fingerprints to the database at 392. The process then moves to 390 and repeat. If the analyzed card was not previously graded, it can be graded as discussed elsewhere herein.

Figure 8:
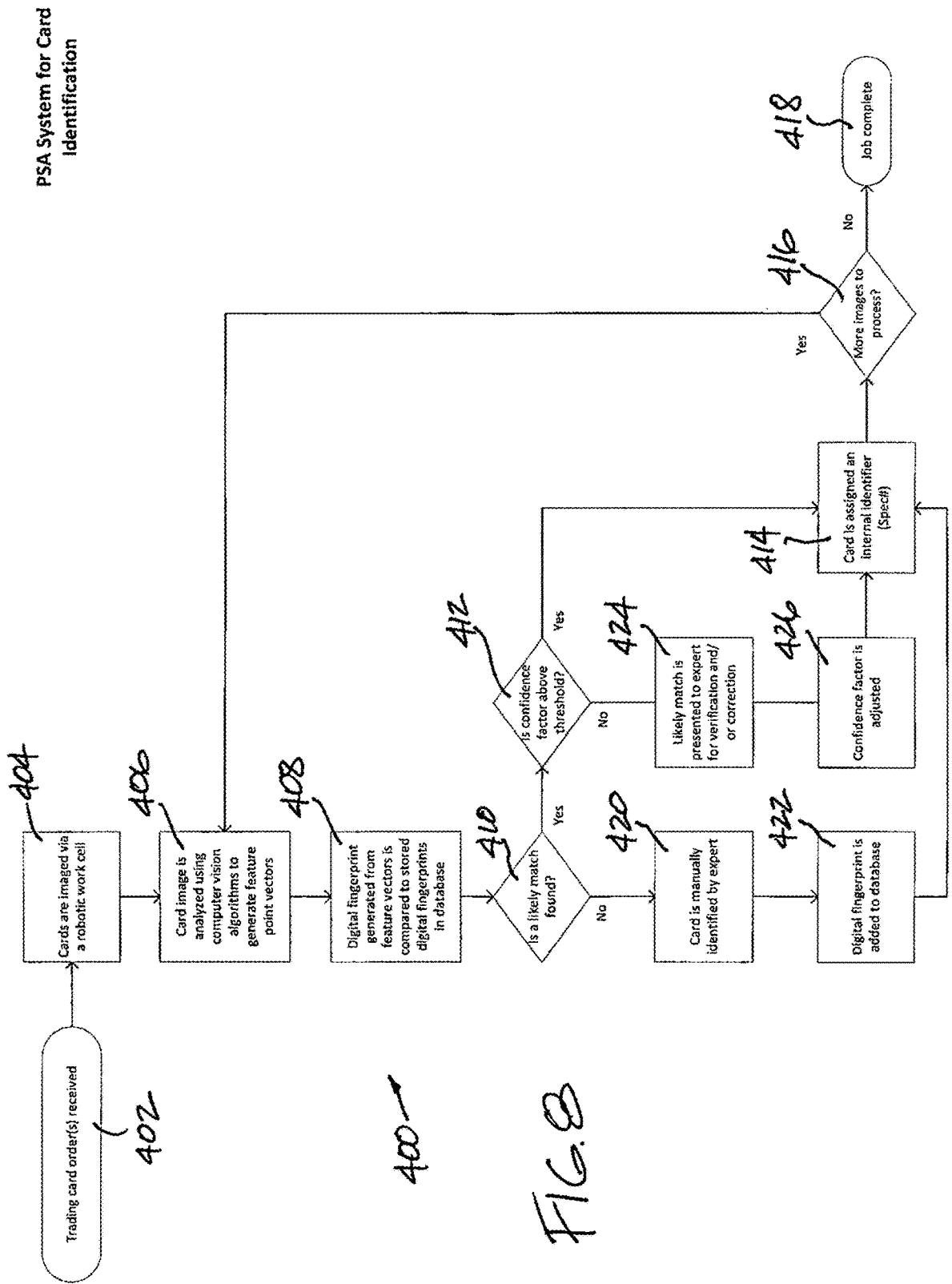
FIG. 8 is flow diagram depicting a process for identify characteristics of a trading card.

FIG. 8 is a schematic diagram representing a protocol 400 for determining whether the process can correctly identify the defining characteristics of a trading card. These characteristics include individual data elements such as Year, Manufacturer, Set, Card #, Player, etc. For example, a 1996 Skybox E—X2000 Kobe Bryant #30 has previously been evaluated and given an internal number, such as a Spec #. If a card to be analyzed is the same type of card, ideally the process outputs a Spec # that matches the Spec # in the database for the same card type. The new information for the new card is then stored in the database for future use.

The process 400 starts with receiving a trading card order for evaluation at 402 and taking front and back images of each of the cards in the order at 404, assuming there is more than one card in the particular order. Steps 402 and 404 can be the same as steps described with reference to FIG. 3. The card images are analyzed using computer vision algorithm to generate feature point vectors at 406. A digital fingerprint generated from the feature point vectors is compared to stored digital fingerprints in the database at 408.

The process then queries whether there is a match found between the generated feature point vectors and stored digital fingerprints in the database at 410. If yes, the process queries whether the confidence factor is above a threshold at 412. If yes, the process assigns an internal identifier, such as a Spec #, to the card at 414. The process then queries whether there are more images to process. If yes, the process moves to 406 and moves to 418 if no, indicating that the process is complete.

Back at 410, if there is no match found between the generated feature point vectors and stored digital fingerprints in the database, the card is then manually identified by an expert grader at 420. The fingerprint is then added to the database at 422 and moves to 414 and repeat.

Back at 412, the process queries whether the confidence factor is above a threshold at 412 and if the answer is no, the grader is presented with a likely match for verification and/or correction at 424. The confidence factor is then adjusted at 426 and the card is assigned an internal identifier or Spec # at 414. The process then repeats as previously described. If the analyzed card was not previously graded, it can be graded as discussed elsewhere herein.

In alternative embodiments for the various processes discussed herein, the collectable items or cards can be imaged outside of a sleeve or without a sleeve and then subsequently placed into a sleeve to proceed with the evaluation. Thus, where a sleeved collectable item is discussed, it is understood that the card located inside the sleeve can first be imaged without the sleeve. In still yet other examples, the process can proceed without ever placing the collectable card or item inside a sleeve. For example, the card can be imaged on the front and back sides and then placed directly into a clear protective housing with a final grade without first being placed inside a sleeve.

Figure 9:
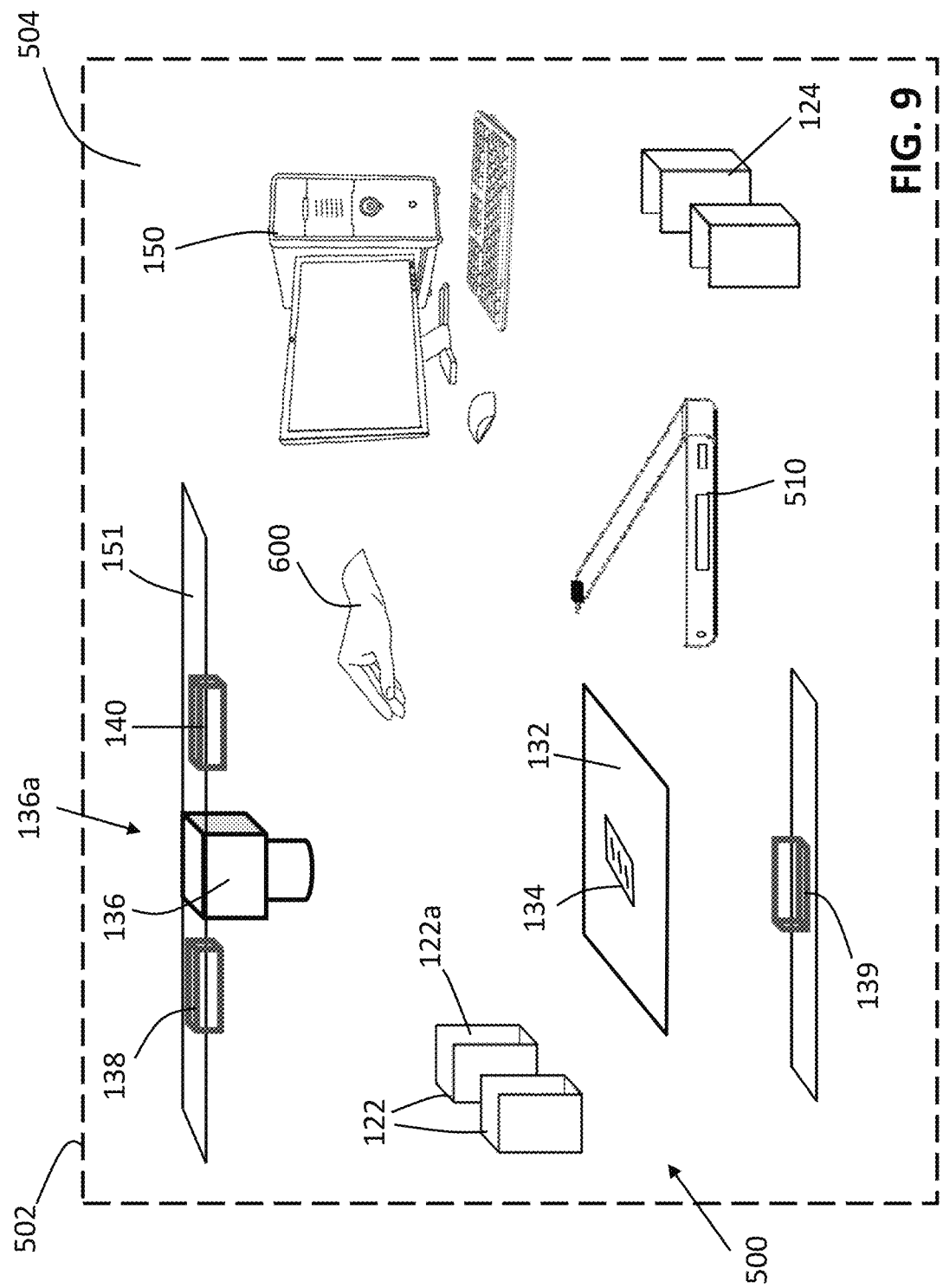
FIG. 9 is a schematic depiction of an alternative automated evaluation system for obtaining images of sleeved collectable items and for issuing first pass grades for the sleeved collectable items.

With reference now to FIG. 9, a block diagram showing an alternative embodiment of an automated evaluation system for identifying and inspecting collectable items in accordance with further aspects of the invention shown, which is generally designated 500. In the example shown, the automated evaluation system or card identifying and inspecting system 500 is similar to the system 100 of FIGS. 1 and 2 with a few exceptions. Most prominently, the present automated evaluation system 500 is without a robot arm. Instead, the various transfer functions of moving a sleeved card from an infeed hopper to the working platform for imaging, flipping the sleeve card for further imaging, and moving the imaged card to the completed hopper are performed using manual hand 600 manipulation, such as by a technician or human grader.

As shown, the present automated evaluation system 500 comprises a housing 502, which can be a cubicle-like space comprising a plurality of walls or panels defining a working space 504 having a plurality of automated evaluation system components located therein, or adjacent thereto or nearby. Outside light interference should be minimized by providing appropriate coverage and shades. At least one infeed hopper 122 and at least one completed hopper 124 are provided with the automated evaluation system 500, with two or more infeed hoppers and two or more completed hoppers contemplated. The hoppers are similar to the hoppers discussed elsewhere herein for temporarily holding sleeved cards to be inspected, authenticated and/or evaluated.

A working platform 132 can be provided for placing a sleeved card 134 thereon by the worker's hand 600. The sleeved card 134 has a front side and a back side, or a first side and a second side. The technician or grader can pick up the sleeved card 134 from the first infeed hopper 122a, as an example, and then place the sleeved card 134 onto the working platform 132 with the front side or first side of the sleeved card facing upward, to face the camera system 136a comprising a camera 136, similar to that of FIG. 1.

One or more images of the front side of the sleeved card 134 can be taken by the camera 136 located directly above the sleeved card 134. For example, two or more images can be taken of the front side of the sleeve card, for example three images, five images, or ten images. The images can be enhanced using one or more light fixtures 138, 140 for generating different lighting conditions for obtaining a set of images to facilitate processing of the sleeved card 134. Alternatively or additionally, light fixtures 139 can be placed below the sleeved card, below the camera 136, to generate backlighting or backlight during the imaging. Thereafter, the sleeved card 134 can be flipped manually by the technician's hand 600 and placed back onto the working platform 132 with the back side of the sleeved card facing upward, such as facing the camera 136. One or more images, such as two or more images, of the back side or second side of the sleeved card 134 can be taken by a camera 136, under different lighting conditions produced by the light fixtures 138, 140, including with backlighting 139. The working platform 132 can comprise markers or boundaries to guide the technician on where to place the sleeved card 134. Alternatively, the sleeved card 134 can be imaged using a scanner 510.

The camera 136 and the light fixtures 138, 140 can be mounted to the same bracket 151 or to different brackets located within the housing 502, or to one or more brackets that form part of the housing 502. In various embodiments, a second or additional and/or other cameras may be incorporated with the automated evaluation system or card identifying and inspecting system 500. For example, a second camera and a second set of light fixtures can be located below working platform to take one or more images of the second side of the sleeved card at the same time as the upper camera 136 take one or more images of first side of the same sleeved card. This way, images can be taken of both sides of the sleeved card by different cameras without having to flip the card.

In various embodiments, the automated evaluation system or card identifying and inspecting system 500 uses image data generated by the camera 136, or cameras, to perform a task or a set of tasks related to authenticating and evaluating the conditions of the sleeved card 134. A processor on a control computer 150 can then be tasked with compiling the images of the sleeved card to determine parameters such as edges of the cards, staining, surface quality, and card dimensions, similar to the system 100 of FIGS. 1 and 2.

Figure 10:
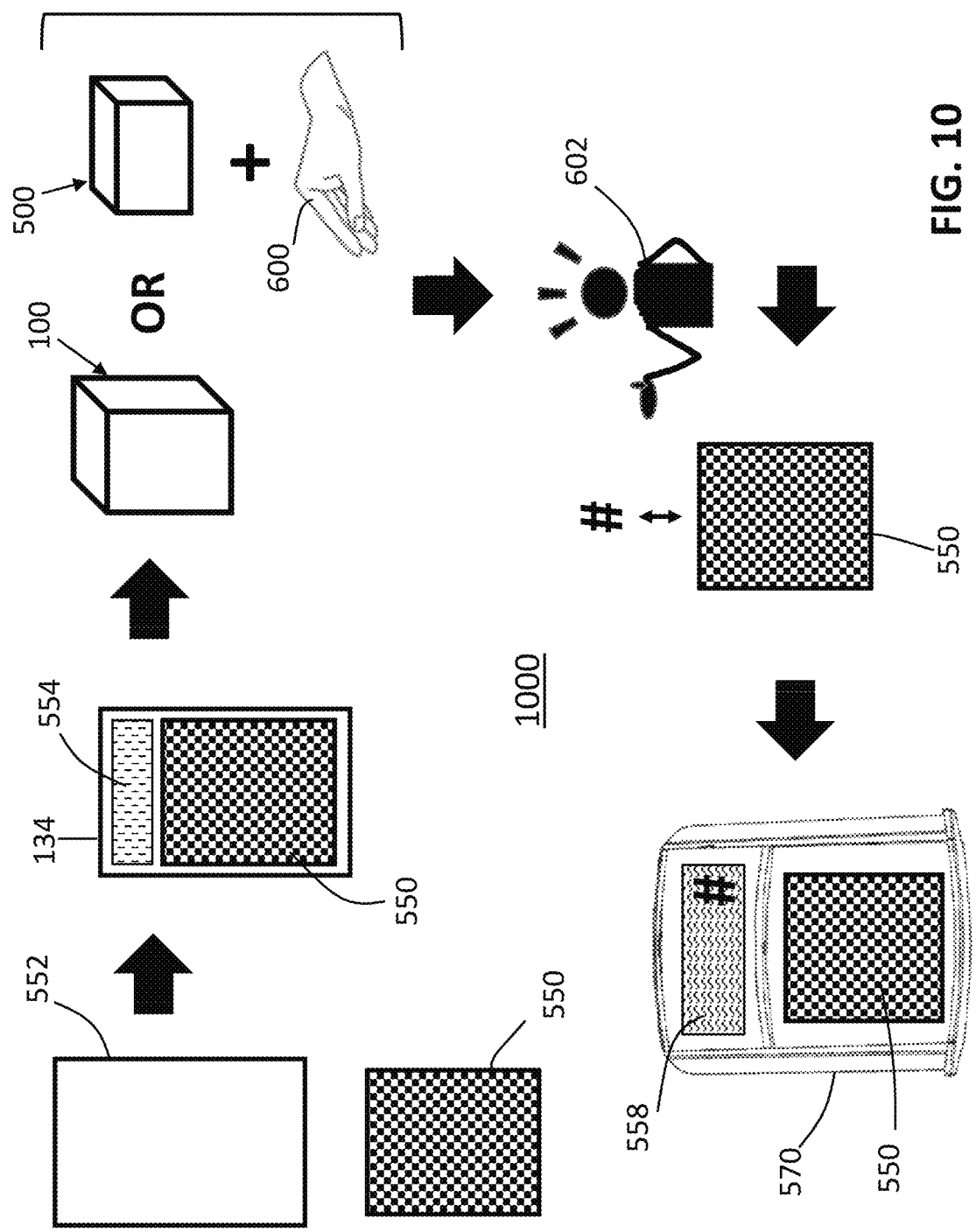
FIG. 10 is a schematic diagram depicting a method for evaluating, inspecting, and/or authenticating sleeved cards.

FIG. 10 is a schematic diagram depicting a method 1000 for evaluating, inspecting, and/or authenticating sleeved cards in accordance with aspects of the invention. In an example, a customer or an order is placed to evaluate, inspect, authenticate and/or grade one or more cards, with only one collectable card 550 shown schematically. As discussed above, the card 550 is then placed inside a plastic sleeve 552 to create a sleeved card 134. An order identifier 554 is then place on the exterior of the sleeve 552.

Next, the sleeved card 134 is imaged with the automated evaluation system 100 of FIGS. 1 and 2 or the automated evaluation system 500 of FIG. 9, which involves manual human 600 intervention to perform various flipping and moving steps, as previously discussed. The imaged collectable card 550 can then be evaluated, inspected, authenticated, and/or provided with a first-pass grade as previously discussed with reference to FIGS. 3-8. Where a first-pass grade is generated by the AI model, a grader 602, who is blind to the first-pass grade and can also provide the manual labor to flip and move the cards, can provide a human generated grade. If the human generated grade is the same as the first-pass grade, then the final grade "#" with the matching grade of the grader and the first-pass grade. If the human generated grade differs from the first-pass grade, one or more additional graders are consulted with and a final grade "#" is given to the collectable card by the two or more graders. The final grade "#" can be the same or different from the first-pass grade. In any event, the final grade "#" preferably has a human component or a human input and not strictly a machine generated final grade.

Thus, the final grade can be understood as the only final grade if the grade matches the first pass grade. If the final grade does not match the first pass grade, then the final grade is a first final grade and a second final grade is generated by a second grader. Then the first final grade and the second final grade can form the final grade. In other examples, the final grade is defined by a third final grade or more, such as additionally with a fourth final grade and a fifth final grade. The additional final grades can be performed by different human graders.

Next, the collectable card 500 is placed inside an interior of a card holder 570, which is typically made from a two-piece clear plastic housing that irreversibly locks together to provide a secured housing that is extremely difficult or impossible to separate. A label 558 can also be added to the interior of the card holder 570. The label 558 can be provided with information regarding the collectable card, identification number, barcode and/or QR code that can be used to access a database to verify the identification or certification number, name of the grading entity, and a final grade "#", among other information. In some instances, a near field communication (NFC) chip may be included in the card holder 570. A smartphone may be used access information stored in the NFC chip, which can include a link to a webpage that provides information about the collectable card 500.

In alternative embodiments for the various processes discussed herein, the collectable items or cards can be imaged outside of a sleeve or without a sleeve and then subsequently placed into a sleeve to proceed with the evaluation. Thus, where a sleeved collectable item is discussed, it is understood that the card located inside the sleeve can first be imaged without the sleeve. In still yet other examples, the process can proceed without ever placing the collectable card or item inside a sleeve. For example, the card can be imaged on the front and back sides and then placed directly into a clear protective housing with a final grade without first being placed inside a sleeve.

Methods of making and of using the robotic system for identifying and grading collectable items and components thereof are within the scope of the present invention.

Although limited embodiments of the robotic system for identifying and grading collectable items and components thereof have been specifically described and illustrated herein, many modifications and variations will be apparent to those skilled in the art. Accordingly, it is to be understood that the robotic system for identifying and grading collectable items and components thereof constructed according to principles of the disclosed devices, systems, and methods may be embodied other than as specifically described herein. The disclosure is also defined in the following claims.

What is claimed is:

1. An automated evaluation system for collectible items comprising:
    an infeed hopper comprising a receiving space sized and shaped to receive collectible items including a first collectible item and a second collectible item with each collectible item comprising a front side and a back side;
    a belt or a conveyor for delivering the collectible items to a working platform located within a housing comprising frames and panels, wherein the working platform comprising a surface defining a plane for supporting at least one of the collectible items;
    a code reader for reading machine readable codes associated with the collectible items for querying order information from a plurality of requests with each request related to one or more of the collectible items;
    a first camera for taking images of the front sides of the collectible items and a second camera for taking images of the back sides of the collectible items;
    a photography jig for supporting the collectible items while imaging the collectible items, the first camera being arranged relative to the photography jig to obtain one or more images of the first sides of the collectible items and the second camera being arranged relative to the photography jig to obtain one or more images of the back sides of the collectible items when the collectible items are located on the photography jig;
    a control computer comprising at least one hardware processor and a memory having stored thereon an artificial intelligence (AI) model for analyzing images of the front sides and the back sides of the collectible items;

a first pass grade generated by the AI model operating on the control computer for the first collectible item based on analysis of the images of the front side and the back side of the first collectible item;

a final grade of the first collectible item based on manual evaluation of the images of the first collectible item; and wherein the first pass grade is based on reviewing the images of the first collectible item for at least two of the following parameters: an edge parameter, a corner parameter, a color parameter, a surface parameter, a center parameter, a sharpness parameter, a print imperfection parameter, a staining parameter, a scratch parameter, a chipping parameter, a crease parameter, and an authenticity parameter.

2. The automated evaluation system of claim 1, further comprising one or more sensors arranged relative to the infeed hopper to detect collectible items located in the infeed hopper.

3. The automated evaluation system of claim 1, wherein the first pass grade is a score from 1 and 10.

4. The automated evaluation system of claim 3, wherein the final grade is a score from 1 and 10.

5. The automated evaluation system of claim 4, wherein the first pass grade and the final grade are different.

6. The automated evaluation system of claim 5, wherein an NFC chip is located in the two-piece rigid plastic housing and an App running on a smartphone is configured to access information stored in the NFC chip.

7. The automated evaluation system of claim 1, wherein the first collectible item is located in a two-piece rigid plastic housing.

8. The automated evaluation system of claim 1, wherein the AI model is programmed to reject a collectible item for failing to satisfy one or more of the parameters.

9. The automated evaluation system of claim 1, further comprising a divider having a machine readable identifier to identify a second order request that differs from a first order request.

10. The automated evaluation system of claim 1, wherein images taken of the first sides and the second sides of the collectible items are stored in the memory of the control computer, on a different computer, on a network, on the Cloud, or on an external hard drive.

11. The automated evaluation system of claim 1, further comprising a robot arm having an end effector for removing the collectible items, one at a time, and placing them onto the photography jig.

12. An automated evaluation system for collectible items comprising:

an infeed hopper comprising a receiving space sized and shaped to receive collectible items that includes a first collectible item and a second collectible item with each collectible item comprising a front side and a back side;

a belt or a conveyor for delivering the collectible items to a working platform located within a housing comprising frames and panels, wherein the working platform comprising a surface defining a plane for supporting at least one of the collectible items;

a code reader for reading machine readable codes associated with the collectible items for querying order information from a plurality of requests with each request related to one or more of the collectible items;

a first camera for taking images of the front sides of the collectible items and a second camera for taking images of the back sides of the collectible items;

a photography jig for supporting the collectible items while imaging the collectible items, the first camera being arranged relative to the photography jig to obtain one or more images of each of the front side of the collectible items and the second camera being arranged relative to the photography jig to obtain one or more images of each of the back side of the collectible items when the collectible items are located on the photography jig;

a completed hopper comprising a receiving space sized and shaped to receive the collectible items after the collectible items have been imaged;

a control computer comprising at least one hardware processor and a memory having stored thereon an artificial intelligence (AI) model for analyzing images of the front sides and the back sides of the collectible items that have been imaged;

a robot arm having an end effector for removing the collectible items and placing the collectible items onto the photography jig for imaging the collectible items; and wherein the AI model is programmed to accept or reject one or more of the collectible items based on analysis of the images acquired by the first camera and the second camera.

13. The automated evaluation system of claim 12, wherein the AI model accepts or rejects the first collectible item based on reviewing the one or more images of the first collectible item for at least two of the following parameters: an edge parameter, a corner parameter, a color parameter, a surface parameter, a center parameter, a sharpness parameter, a print imperfection parameter, a staining parameter, a scratch parameter, a chipping parameter, a crease parameter, and an authenticity parameter.

14. The automated evaluation system of claim 12, wherein the AI model is programmed to issue a first pass grade for the first collectible item based on analysis of the images of the front side and the back side of the first collectible item.

15. The automated evaluation system of claim 14, wherein the first pass grade is based on combining grades from multiple parameters.

16. The automated evaluation system of claim 15, wherein at least one of the grades from one of the parameters is adjusted with a weight factor of 1.1 to 1.3.

17. The automated evaluation system of claim 12, wherein image data files to be analyzed by the AI model resides on the control computer, on a different computer, on a network, on the Cloud, or on an external hard drive.

18. The automated evaluation system of claim 12, wherein the control computer is configured to alert a user to intervene before the second collectible item is placed in the completed hopper.

19. The automated evaluation system of claim 12, wherein each of the collectible items is located inside a clear plastic sleeve.

20. The automated evaluation system of claim 12, further comprising a sensor for detecting whether collectible items are located in the infeed hopper.

21. The automated evaluation system of claim 12, wherein each collectible item is located inside a protective cover before being imaged by the first camera and the second camera.

22. The automated evaluation system of claim 21, wherein each collectible item is coupled with a label that contains information about the collectible item.

23. The automated evaluation system of claim 12, wherein the collectible items are collectible cards.

\* \* \* \* \*